US011952944B1

(12) United States Patent
Niergarth et al.

(10) Patent No.: US 11,952,944 B1
(45) Date of Patent: Apr. 9, 2024

(54) JET ENGINE THERMAL TRANSPORT BUS PUMPS

(71) Applicant: General Electric Company, Schenectady, NY (US)

(72) Inventors: Daniel A. Niergarth, Evendale, OH (US); Giridhar Jothiprasad, Niskayuna, NY (US); Rodrigo Rodriguez Erdmenger, Garching (DE); Adam Joseph Wangler, Evendale, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/167,643

(22) Filed: Feb. 10, 2023

(51) Int. Cl.
*F02C 7/141* (2006.01)
(52) U.S. Cl.
CPC ........ *F02C 7/141* (2013.01); *F05D 2220/323* (2013.01); *F05D 2260/20* (2013.01)
(58) Field of Classification Search
CPC ........... F05D 2260/213; F05D 2260/20; F05D 2220/76; F05D 2220/30; F05D 2220/323;
(Continued)

(56) References Cited

U.S. PATENT DOCUMENTS 4,275,557 A 6/1981 Marvin et al.
9,038,397 B2 5/2015 Papa et al.
(Continued)

FOREIGN PATENT DOCUMENTS

KR 2023001137 U * 6/2023

*Primary Examiner* — Craig Kim
(74) *Attorney, Agent, or Firm* — Hanley, Flight & Zimmerman, LLC

(57) ABSTRACT

Jet engine thermal transport bus pumps are disclosed. Disclosed herein is an aircraft comprising a gas turbine engine configured to burn fuel at a fuel flow rate to generate an engine power ($P_{engine}$), the fuel characterized by a first specific heat capacity ($c_{p\_fuel}$) and a net heat of combustion ($NHC_{fuel}$); and a thermal management system configured to transfer heat from a working fluid to the fuel, the working fluid characterized by a second specific heat capacity ($c_{p\_pump}$) and a first density ($\rho_{pump}$), the thermal management system including a pump configured to generate a pump power ($P_{pump}$) to pressurize the working fluid, and wherein $$POW = \frac{P_{pump}}{\left(\frac{c_{p\_pump}}{c_{p\_water}}\right)\left(\frac{\rho_{water}}{\rho_{pump}}\right)^2}, FFR = \left(\frac{P_{engine}}{NHC_{fuel}}\right)\left(\frac{c_{p\_fuel}}{c_{p\_pump}}\right)$$

$0.008 \leq POW/FFR^{5/3} \leq 12$, FFR is between 0.05 pounds-mass per second and 16 pounds-mass per second, and $\rho_{water}$ and $c_{p\_water}$ is the density and specific heat capacity of water, respectively.

21 Claims, 8 Drawing Sheets

(58) Field of Classification Search
CPC ........ F05D 2220/74; F02C 7/14; F02C 7/141;
F01D 15/10
See application file for complete search history.

(56) References Cited

U.S. PATENT DOCUMENTS

| | | | |
|---|---|---|---|
| 9,915,201 B2* | 3/2018 | Karam | F02C 3/13 |
| 10,167,732 B2* | 1/2019 | Himmelmann | F01D 17/20 |
| 10,260,419 B2* | 4/2019 | Cerny | F02C 7/224 |
| 11,261,792 B2* | 3/2022 | Niergarth | F02C 7/16 |
| 11,286,855 B2* | 3/2022 | Tang | F01D 17/085 |
| 2017/0175019 A1* | 6/2017 | Ginestra | C10L 1/04 |
| 2020/0224588 A1* | 7/2020 | Somanath | F02C 6/02 |
| 2020/0291857 A1* | 9/2020 | Tang | F02C 3/06 |
| 2021/0148283 A1* | 5/2021 | Niergarth | F01D 25/12 |
| 2021/0381391 A1 | 12/2021 | Ono et al. | |
| 2022/0089437 A1* | 3/2022 | Shrivastava | B01D 53/1475 |
| 2023/0064430 A1* | 3/2023 | Dupeu | F02C 9/30 |
| 2023/0072590 A1* | 3/2023 | Smith | F02C 7/06 |
| 2023/0076951 A1* | 3/2023 | Smith | F02C 7/236 |
| 2023/0135126 A1* | 5/2023 | Losch | B01J 19/246 |
| | | | 60/39.12 |
| 2023/0183097 A1* | 6/2023 | Bauer | C10G 31/06 |
| | | | 210/708 |
| 2023/0193837 A1* | 6/2023 | Keeler | F23R 3/26 |
| | | | 60/39.281 |
| 2023/0193867 A1* | 6/2023 | Nakai | F02D 45/00 |
| | | | 123/446 |

\* cited by examiner

US 11,952,944 B1

JET ENGINE THERMAL TRANSPORT BUS PUMPS

FIELD OF THE DISCLOSURE

This disclosure relates generally to fluid pumps, and, more particularly, to pumps for aircraft jet engines.

BACKGROUND

Aircraft typically include various accessory systems supporting the operation of the aircraft and/or its gas turbine engine(s). For example, such accessory systems may include a lubrication system that lubricates components of the engine(s), an engine cooling system that provides cooling air to engine components, an environmental control system that provides cooled air to the cabin of the aircraft, and/or the like. As such, heat is added or removed to/from these accessory systems via a fluid (e.g., oil, air, etc.) transmitted throughout a thermal management system, such as a closed-loop advanced Brayton cycle.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
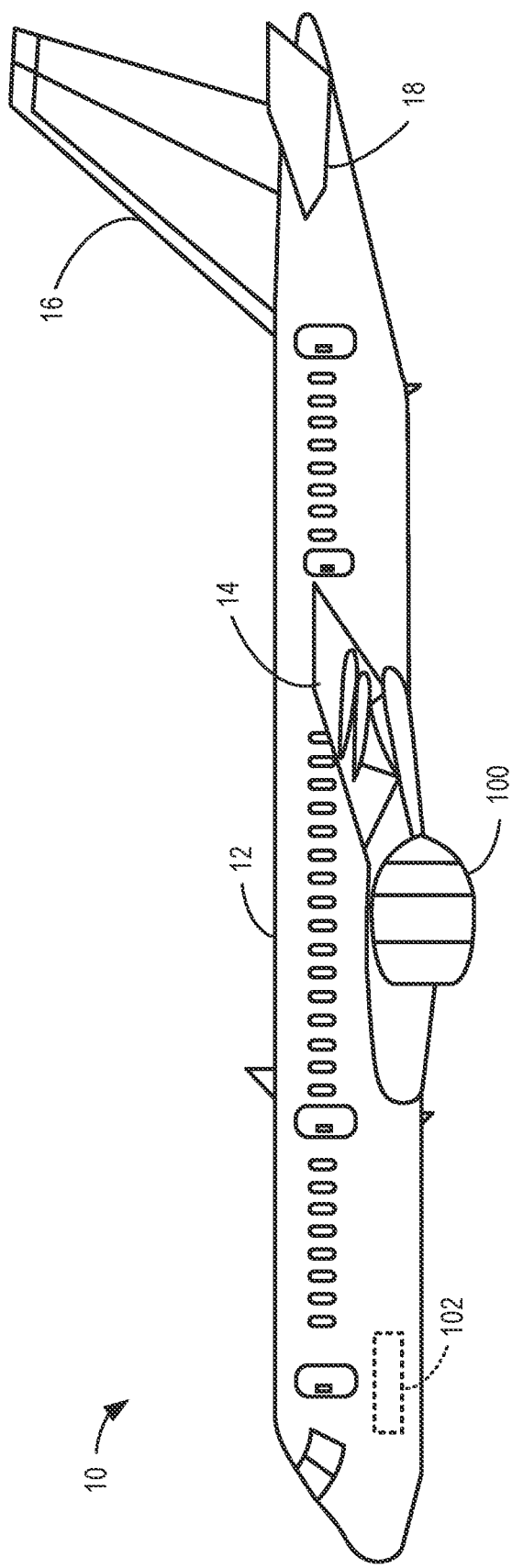
FIG. 1 is a side view of an example aircraft.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

The terms "forward" and "aft" refer to relative positions within a gas turbine engine, pump, or vehicle, and refer to the normal operational attitude of the gas turbine engine, pump, or vehicle. For example, with regard to a gas turbine engine, forward refers to a position closer to an engine inlet and aft refers to a position closer to an engine nozzle or exhaust. Further, with regard to a pump, forward refers to a position closer to a pump inlet and aft refers to a position closer to an end of the pump opposite the inlet.

The terms "upstream" and "downstream" refer to the location along a fluid flow path relative to the direction of fluid flow. For example, with respect to a fluid flow, "upstream" refers to a location from which the fluid flows, and "downstream" refers to a location toward which the fluid flows. For example, with regard to a gas turbine engine, an engine inlet is said to be upstream of an engine outlet, and the engine outlet is said to be downstream of the engine inlet.

Various terms are used herein to describe the orientation of features. In general, some of the attached figures are annotated with a set of axes including an axis of rotation (e.g., axial axis) z and a radial axis r. In general, the attached figures can be annotated with reference to an axial direction A, a radial direction R, and/or a circumferential direction C of the vehicle associated with the features, forces, and moments. The axial direction refers to a direction parallel to the axis of rotation z about which the rotating components of a turbine engine rotate. The radial direction refers to a direction that is perpendicular to the axis of rotation and points towards (radially inward) or away from (radially outward) the axis of rotation. The circumferential direction at a given point is a direction that is normal to a local radial direction and normal to the axial direction. Reference is made to a meridional plane, which is a plane defined by a constant polar angle in cylindrical coordinates. The meridional plane refers to the plane formed by the axis of rotation and the radial axis.

The term "thrust class" refers to a group or classification of gas turbine engines, or a type of gas turbine engine that can generate a similar amount of thrust during various flight conditions (e.g., takeoff, cruise, landing, etc.), as specified in engine certification documents. For example, a first thrust class includes one or more gas turbine engines that generate a maximum cruise thrust between 30000 pounds-force (lbf) and 40000 lbf.

The term "specific fuel consumption (SFC)" refers to how efficiently a gas turbine engine converts chemical energy into mechanical energy. Typically, the SFC of a gas turbine engine is based on the thrust class of the gas turbine engine, meaning that the SFC can change significantly between different thrust classes, and that engines within a thrust class share same or similar SFCs. In this instance, SFC (also known as TSFC) can be defined as a mass flow rate of the fuel injected into the combustion chamber per unit of thrust generated.

As used herein, "normalization" refers to the creation of shifted and scaled versions of variables used in relationships disclosed herein. The normalized valves allow for the comparison of variables, ratios, and/or relationships in a way that eliminates or lessens the effects of certain gross influences (e.g., density, viscosity, specific heat capacity, etc.).

The term "pump power" refers to the power the pump uses to pressurize a working fluid to a mass flow rate. The term "corrected pump power" refers to the pump power that is normalized based on the properties of water to represent the pump power used to pressurize water to the same mass flow rate.

The term "rotor diameter" refers to an exit diameter of a most upstream rotor in a pump. The most upstream rotor can be either the only rotor in a single-stage pump or the most upstream rotor in a multistage pump. For example, in a multistage centrifugal pump (or compressor) the most upstream rotor is the impeller that the working fluid first contacts upon flowing into the inlet of the pump. The term "corrected rotor diameter" refers to an exit diameter of the most upstream rotor in the pump that has been normalized based on the properties of water. For example, if a first pump includes a first impeller having a rotor diameter to pressurize a working fluid to a certain mass flow rate, then a second pump can include a second impeller with a corrected rotor diameter to pressurize water to the same mass flow rate.

The term "exit diameter" refers to the diameter of a rotor (e.g., an impeller of a centrifugal/radial pump/compressor or a rotor of an axial pump/compressor) at a most downstream point of the rotor. In some examples, when referring to impellers of centrifugal pumps, the exit diameter corresponds to the diameter at the outermost tip of the impeller vanes. In some examples, when referring to rotors of axial pumps, the exit diameter corresponds to the diameter at the trailing edge of the rotor blades.

The term "fuel flow rate" refers to the mass flow rate of fuel injected into a combustor of the gas turbine engine to generate thrust for cruising conditions. The term "corrected fuel flow rate" refers to the fuel flow rate that is normalized based on properties (e.g., specific heat capacities, etc.) of a fuel being burned and a working fluid in a thermal transport bus (described below).

The term "net heat of combustion (NHC)" refers to a quantity of energy (heat) released per unit mass of fuel burned, assuming that the fuel is burned at constant pressure and the products of the combustion are gaseous. The NHC is a property of fuel that varies among different types of fuels (e.g., Jet-A, Biodiesel, etc.).

The term "specific heat capacity ($c_p$)" refers to a quantity of heat that is to be added to a unit mass of a substance to cause an increase of one unit in temperature. For example, the heat required to increase the temperature of one kilogram (kg) of water by one Kelvin (K) is 4184 joules (J), so the specific heat capacity of water ($c_{p\_water}$) is 4184 J/kg*K.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken as limiting on the scope of the subject matter described in this disclosure. Certain features from different aspects of the following description may be combined to form yet new aspects of the subject matter discussed below.

A turbine engine, also referred to herein as a gas turbine engine, is a type of internal combustion engine that uses atmospheric air as a moving fluid. The gas turbine engine is a turbofan engine that includes a fan section upstream of a low-pressure compressor section and a bypass airflow passage. During operation, a volume of air enters an inlet of the engine and passes into the fan section. A first portion of air is directed or routed into the bypass airflow passage, and a second portion of air is directed or routed into the low-pressure compressor section where the pressure of the air is increased. The pressure of the second portion of air is further increased as it is routed through a high-pressure compressor section and into a combustion chamber where the pressurized air is mixed with fuel and burned to provide combustion gases. Subsequently, the combustion gases are routed through a high-pressure turbine section and a low-pressure turbine section, where a portion of thermal and/or kinetic energy from the combustion gases is extracted.

The combustion gases are then routed through a jet exhaust nozzle section of the gas turbine engine to provide propulsive thrust. Simultaneously, the pressure of the first portion of air is substantially increased as the first portion of air is routed through the bypass airflow passage before it is exhausted from a fan nozzle exhaust section of the turbofan engine, also providing propulsive thrust. The combination of propulsive thrusts from the first and second portions of air determines an overall thrust that the turbofan engine generates to propel the aircraft in flight. In this sense, the power of the gas turbine engine can be defined as a product of the overall thrust and the cruising speed of the aircraft. In general, as the size of the gas turbine engine increases, so does the engine power, the thrust class, and the SFC thereof.

Pumps (e.g., centrifugal pumps/compressors, axial pumps/compressors, etc.) are utilized in thermal management systems (TMSs) to pressurize (drive) a working fluid (e.g., water, oil, supercritical carbon dioxide (sCO2), liquid helium, helium-xenon, etc.) through a thermal transport bus loop. Such TMSs can heat or cool accessory systems, sections, and/or components in the engine(s) to improve the power, efficiency, and/or structural integrity thereof. The TMS includes the thermal transport bus (TTB) to transmit the working fluid (or heat exchange fluid) between elements (e.g., accessory systems, sections, components, etc.) of the gas turbine engine such that heat can be transferred to/from the working fluid and from/to the elements.

In some examples, the TMS uses sCO2 as the working fluid because it has a low viscosity and a high specific heat, enabling heat exchangers to efficiently transfer heat to and/or from the sCO2. Additionally, sCO2 is chemically stable, reliable, readily available, and non-flammable, making sCO2 more advantageous than some other heat exchange fluids (e.g., water, air, etc.). Furthermore, sCO2 is not prone to phase changes, unlike other heat exchange fluids, such as water, that can freeze or evaporate. The TMS includes a TTB pump (or sCO2 pump) to pressurize the sCO2 within the TTB. The TTB pump may be a centrifugal pump or an axial pump (e.g., a single-stage centrifugal pump, a multistage centrifugal pump, a multistage axial pump, etc.) that uses an electric motor to rotate a shaft coupled to one or more rotors (e.g., impellers, rotor blades, etc.), which draws the working fluid into a pump inlet and accelerates the working fluid radially and/or axially to the pump outlet and/or other rotors in the pump. In some examples, the TTB is a rotary screw pump, as described below.

The motor converts electrical energy of an armature into mechanical work of a shaft coupled thereto. The shaft generates a torque and rotates at a rotational speed. Because the rotor is coupled to the shaft, the torque is transferred to the rotor, and the rotor rotates at the same angular velocity. Pump power (e.g., mechanical power, fluid power, etc.) corresponds to a product of the amount of torque generated and the rotational speed of the shaft. Thus, as the pump power increases, the rotational speed also increases. As the shaft of the pump rotates, the rotor(s) compress or pressurize the working fluid to a certain pressure head. The term "pressure head" is used herein as a measure of kinetic energy that the pump generates. Generally, the pressure head is the measurement of a height of an incompressible fluid column that the pump could create based on the kinematic energy provided to the incompressible fluid. As the pressure head increases, the working fluid accelerates, and a mass flow rate of the working fluid (e.g., compressible fluid, such as sCO2) also increases.

The angular velocity (or rotational speed) of the rotor (e.g., impeller for centrifugal pumps, rotor blades for axial pumps, etc.) remains constant along its diameter. However, a tangential velocity at a point on the rotor equals the product of the angular velocity and a distance from the point to an axis of rotation of the rotor. Thus, the tangential velocity of the rotor is largest at its tip and/or outer diameter. The pressure head that the rotor generates is directly proportional to the tangential velocity at an exit diameter of the rotor. For example, when the pump is a single-stage centrifugal pump with an impeller as the rotor, the pressure head doubles as the impeller diameter doubles. Furthermore, the pump head is directly proportional to the square of the angular velocity of the rotor. For example, when the angular velocity doubles, the pressure head quadruples. Therefore, since the mass flow rate increases with the pressure head, and the pressure head increases with the angular and tangential velocities, both the pump power and the rotor diameter affect the mass flow rate that the pump can supply.

It is to be appreciated that the temperature of the fuel can affect the SFC (or efficiency) of an engine. That is to say, increasing the temperature of the fuel prior to injection into the combustion chamber can increase the energy (heat) generated while reducing the amount of fuel consumed, which can improve (reduce) the SFC of the gas turbine engine. Furthermore, the mass flow rate of the working fluid within the TMS can affect the amount of heat transferred to the fuel. Because the pump power and the rotor diameter of the TTB pump affect the mass flow rate, a certain pump power and/or a rotor diameter can be determined to improve the SFC of a gas turbine engine based on a certain thrust class (or corrected fuel flow rate) of the gas turbine engine. Moreover, the TTB pump can be designed to produce a pump power that can improve the SFC of the engine without introducing other unacceptable drawbacks, such as increased engine weight, increased pump volume, reduced engine efficiency, etc.

Designing the TTB pump to improve the SFC of the engine can be a challenging process that involves many tradeoffs between the TTB pump size and the SFC benefit that the TTB pump provides. To increase the pump power, the pump may be fitted with a larger motor, drive shaft, compressor, etc., which ultimately increases the volume and weight of the pump. Analyses are typically performed and iterated upon to design a TTB pump that outputs a proper amount of power for a particular aircraft thrust-producing gas turbine engine without oversizing the TTB pump. Such analyses can be uncertain, indeterminate, time-consuming, and are regarded as highly dependent upon a particular engine architecture.

When designing a TTB pump for a particular thrust class, there is no conventional design standard that limits the size of the pump while also providing a pump power to achieve the desired SFC benefit. As such, conventional TTB pumps can be oversized or undersized for a given thrust class. Increasing the pump power improves the SFC, but also increases the size of the TTB pump. At a certain point, the SFC benefits from increased pump power are outweighed by the increased size (e.g., weight and volume) of the pump. In other words, the TTB pump design can be oversized in an attempt to improve the SFC of the engine. On the other hand, the power of the TTB pump may be reduced in an attempt to limit the weight and volume of the pump. However, this can result in a pump that is undersized and does not provide an SFC benefit to the given engine thrust class. There is a significant challenge in designing a TTB pump for a thrust producing jet engine of an aircraft that is neither oversized nor undersized and that operates at a pump power that provides a desirable SFC benefit to the engine.

The inventors developed architectures for gas turbine engines and the TTB pump of the TMS in the aircraft. Particularly, the inventors proceeded in the manner of designing TTB pumps with given performance characteristics of the pump motor (e.g., power, etc.) and dimensional characteristics of the pump rotor (e.g., exit diameter, etc.). The inventors redesigned the TTB pump to achieve particular mass flow characteristics of the working fluid in the TMS and heat transfer rates between the working fluid and the fuel in the engine, hence increasing the temperature of the fuel, improving an SFC of the gas turbine engine, and reducing overall fuel consumption of the engine. The inventors rechecked the TTB pump power, the exit rotor diameter, the size of the TTB pump, and the SFC of the engine that resulted from the redesigned TTB pump during the design of several different types of gas turbine engines and TTB pumps, including the TTB pumps and engines described below in connection with FIGS. 6 and 7.

During the process of studying and evaluating various performance characteristics of TTB pump, and size characteristics (e.g., dimensions, weight, etc.) of the TTB pump considered feasible for best satisfying flight requirements, the inventors unexpectedly discovered that a certain relationship exists between pump power and a fuel flow rate of the engine as well as a relationship between pump exit rotor diameter and the fuel flow rate of the engine. These relationships provide a certain sized TTB pump that improves the SFC of the engine while reducing the weight of the TTB pump and providing additional space in the aircraft and/or the engine for other components, systems, and subsystems. This discovery is described in greater detail below.

For the figures disclosed herein, identical numerals indicate the same elements throughout the figures. Referring now to the drawings, FIG. 1 is a side view of an example aircraft 10. As shown in FIG. 1, the aircraft 10 includes a fuselage 12 and a pair of wings 14 (one is shown) extending outward from the fuselage 12. In the illustrated example, a gas turbine engine 100 is supported on each wing 14 to propel the aircraft through the air during flight. Additionally, the aircraft 10 includes a vertical stabilizer 16 and a pair of horizontal stabilizers 18 (one is shown). However, in some examples, the aircraft 10 includes engines of different types and/or in different positions than the illustrative example of FIG. 1.

Furthermore, the aircraft 10 includes a thermal management system 102 (TMS 102) for transferring heat between fluids supporting the operation of the aircraft 10. More specifically, the aircraft 10 includes one or more accessory systems configured to support the operation of the aircraft 10. For example, such accessory systems include a lubrication system that lubricates components of the engines 100, a cooling system that provides cooling air to components of the engines 100, an environmental control system that provides cooled air to the cabin of the aircraft 10, and/or the like. In such examples, the TMS 102 is configured to transfer heat from one or more fluids supporting the operation of the aircraft 10 (e.g., the oil of the lubrication system, the air of the cooling system and/or the environmental control system, and/or the like) to one or more other fluids supporting the operation of the aircraft 10 (e.g., the fuel supplied to the engines 100). However, in some other examples, the TMS 102 is configured to transfer heat directly to and/or from other components that support the operation of the aircraft 10 without an intermediate fluid.

Although examples disclosed herein are described with reference to the aircraft 10 of FIG. 1, examples disclosed herein can be applicable to another type or configuration of aircraft that uses a thermal management system similar to the TMS 102 of FIGS. 1-3. Thus, the present subject matter can be readily adaptable to another aircraft (e.g., military jet aircraft, cargo aircraft, etc.) with another engine (e.g., turbojet, turboprop, etc.). Furthermore, although the TMS 102 of FIG. 1 is shown as located in the fuselage 12 of the aircraft 10, the TMS 102 (or a portion of the TMS 102, such as the TTB, a heat exchanger, the TTB pump, etc.) can be located within the wing 14, the engine 100, and/or another location in the aircraft 10.

Figure 2:
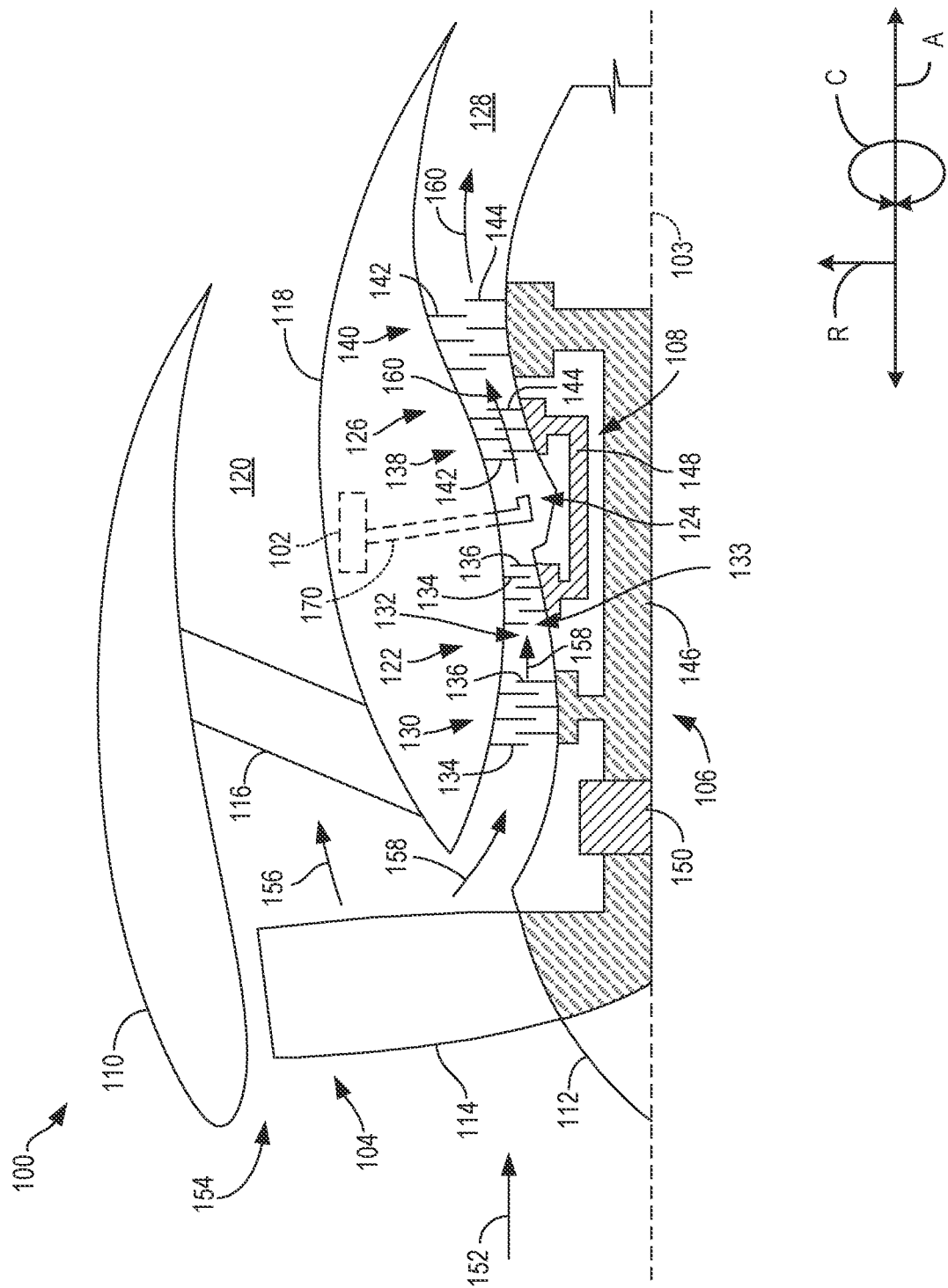
FIG. 2 is a schematic cross-sectional view of an example gas turbine engine of an aircraft.

FIG. 2 is a schematic cross-sectional view of an example gas turbine engine 100. In the illustrated example, the engine 100 is configured as a high-bypass turbofan engine. However, in some examples, the engine 100 is configured as a propfan engine, a turbojet engine, a turboprop engine, a turboshaft gas turbine engine, and/or the like.

In the illustrated example, the engine 100 includes the TMS 102. In some examples, the entire TMS 102 is located within the engine 100. In some examples, a portion of the TMS 102 is located in the engine 100 and other portion(s) of the TMS 102 are located in other component(s) (e.g., the fuselage 12, the wing 14, etc.) of the aircraft 10. The engine 100 extends along an axial centerline 103 and includes a fan 104, a low-pressure (LP) spool 106, and a high pressure (HP) spool 108, which are at least partially encased by an annular housing or nacelle 110. More specifically, the fan 104 can include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 103. As shown, the LP spool 106 is rotatably coupled to the fan rotor 112, which permits the LP spool 106 to rotate the fan blades 114. Additionally, a plurality of outlet guide vanes or struts 116 are circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. In some examples, the compressor section 122 includes a low-pressure (LP) compressor 130 of the LP spool 106 and a high-pressure (HP) compressor 132 of the HP spool 108 positioned downstream from the LP compressor 130 along the axial centerline 103. Each compressor 130, 132 can, in turn, include one or more rows of compressor stator vanes 134 interdigitated with one or more rows of compressor rotor blades 136. As such, the compressors 130, 132 define a compressed air flow path 133 extending therethrough. Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 103. Each turbine 138, 140 can, in turn, include one or more rows of turbine stator vanes 142 interdigitated with one or more rows of turbine rotor blades 144.

Additionally, the LP spool 106 includes a low-pressure (LP) shaft 146 and the HP spool 108 includes a high-pressure (HP) shaft 148 positioned concentrically around the LP shaft 146. In such examples, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

In some examples, the engine 100 generates thrust to propel an aircraft. More specifically, during operation, air 152 enters an inlet portion 154 of the engine 100. The fan 104 supplies a first portion 156 of the air 152 to the bypass airflow passage 120 and a second portion 158 of the air 152 to the compressor section 122. The second portion 158 of the air 152 first flows through the LP compressor 130 in which the compressor rotor blades 136 therein progressively compress the second portion 158 of the air 152. Next, the second portion 158 of the air 152 flows through the HP compressor 132 in which the compressor rotor blades 136 therein continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 in which the turbine rotor blades 144 of the HP turbine 138 extract a first portion of kinetic and/or thermal energy therefrom. This energy extraction rotates the HP shaft 148, which drives the HP compressor 132. The combustion gases 160 then flow through the LP turbine 140 in which the turbine rotor blades 144 of the LP turbine 140 extract a second portion of kinetic and/or thermal energy therefrom. This energy extraction rotates the LP shaft 146, which drives the LP compressor 130 and the fan 104 via the gearbox 150. The combustion gases 160 then exit the engine 100 through the exhaust section 128.

As mentioned above, the aircraft 10 includes the TMS 102 for transferring heat between fluids supporting the operation of the aircraft 10. In this respect, the TMS 102 is positioned within the engine 100. For example, as shown in FIG. 2, the TMS 102 is positioned within the outer casing 118 of the engine 100. However, in some other examples, the TMS 102 (or portions of the TMS 102) is positioned at another location within the engine 100, such as the nacelle 110.

In the illustrated example, the TMS 102 transfers heat to a fuel flowing through a fuel supply flowline 170. In some examples, the fuel supply flowline 170 transmits fuel from a supply tank and/or a fuel pump to the combustion section 124. In some examples, the TMS 102 transfers heat from a working fluid (e.g., a heat exchange fluid such as a supercritical fluid (e.g., supercritical carbon dioxide ($sCO_2$), etc.)) within the TTB to the fuel within the fuel supply flowline 170 via a heat sink exchanger (described below). A pressure and/or a flow rate of the working fluid within the TMS 102 defines a rate at which thermal energy is transferred between the working fluid and the fuel. Furthermore, the pump power and/or the rotor diameter of the TTB pump of the TMS 102 affect the rate of heat transfer between the working fluid and the fuel. Additionally, the heat of the fuel in the fuel supply flowline 170 (upstream of the combustion section 124) can affect the SFC of the engine. Thus, it is advantageous for the TMS 102 to produce a certain pressure and/or flow rate with an efficiently sized TTB pump such that the SFC of the engine is effectively improved without the TMS 102 adding substantial weight to the engine 100.

Although examples disclosed herein are described with reference to the gas turbine engine 100 of FIG. 2, examples disclosed herein can be applicable to another type or configuration of engine that uses a thermal management system similar to the TMS 102 of FIGS. 1-3. Thus, the present subject matter can be readily adaptable to another engine and/or another heat transfer application associated with another type of aircraft.

Figure 3:
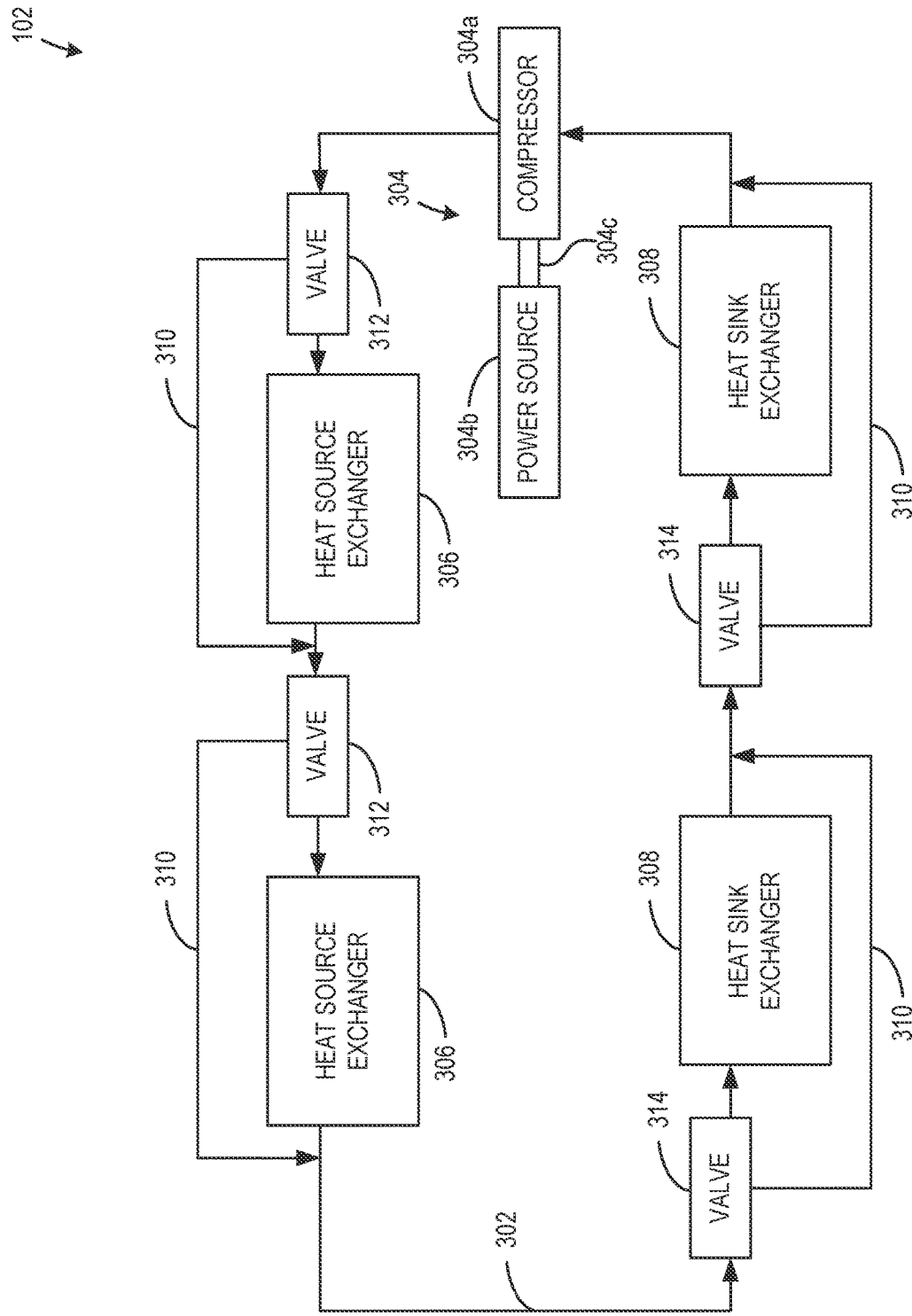
FIG. 3 is a schematic diagram of an example thermal management system to transfer heat between fluids.

FIG. 3 is a schematic diagram of an example implementation of the TMS 102 for transferring heat between fluids. In general, the TMS 102 is discussed in the context of the aircraft 10 and the gas turbine engine 100 described above and shown in FIGS. 1 and 2. However, the TMS 102 can be implemented within another type of aircraft and/or another gas turbine engine of another configuration.

As shown, the TMS 102 includes a thermal transport bus 302 to transmit a working fluid (e.g., a heat exchange fluid) throughout the TMS 102. Specifically, the thermal transport bus 302 (TTB 302) includes one or more fluid conduits through which the working fluid flows. As described below, the working fluid flows through various heat exchangers such that heat is added to and/or removed from the working fluid. In the illustrated example, the working fluid can be supercritical carbon dioxide ($sCO_2$), oil, liquid helium, helium-xenon, and/or the like. Furthermore, the TMS 102 includes a thermal transport bus pump 304 (TTB pump 304) to pump the working fluid through the TTB 302.

The TTB pump 304 of the TMS 102 includes a compressor $304a$ and a power source $304b$ coupled to a shaft $304c$. The compressor $304a$ is rotatably interlocked with the shaft $304c$, and the power source $304b$ drives rotation of the shaft $304c$. Thus, the power source $304b$ drives rotation of the compressor $304a$, and the rotation of the compressor $304a$ provides a pressure head to the working fluid in the TTB 302 downstream of the TTB pump 304. When the compressor $304a$ increases the pressure of the working fluid, the flow rate of the working fluid accelerates downstream toward a low pressure end (e.g., upstream of the TTB pump 304). Thus, the TTB pump 304 drives the working fluid through the TMS 102.

In some examples, the compressor $304a$ is a centrifugal compressor (or radial compressor) and includes one or more impellers. Thus, the working fluid can enter along an axis of rotation of the compressor $304a$ and accelerate radially outward from the rotating impeller into an outlet port, which creates the increased pressure head. In some examples, the compressor $304a$ is a single-stage centrifugal compressor having a single impeller mounted on an end of the shaft $304c$. In some examples, the compressor $304a$ is a multi-stage centrifugal compressor having multiple impellers mounted in series along on the shaft $304c$. In some examples, the compressor $304a$ is an axial compressor having multiple stages of rotors and stators that sequentially increase the pressure of the working fluid. Thus, the working fluid can enter along the axis of rotation of the compressor $304a$ and pressurize/accelerate along a flow path parallel to the axis of rotation. In some examples, the compressor $304a$ is a rotary screw compressor including two adjacent shafts with spiral threads that mesh together. As the working fluid radially enters the rotary screw compressor, the two shafts rotate and force the fluid axially along the shafts. The fluid pressure increases as the rotating threads drive the flow into an outlet where the working fluid radially exits from the rotary screw compressor.

The power source 304b generates torque from electrical and/or mechanical power and transfers that torque along the shaft 304c to the compressor 304a. In some examples, the power source 304b is an electric motor (e.g., direct current (DC) brushless motor, etc.) including fields magnets that emit magnetic fields and an armature (or armature windings) that generate alternating electromagnetic fields. Either the stator or the rotor can be configured as the armature based on the type of example motor implemented as the power source 304b. In such examples, the electric motor includes a rotor and a stator, and the rotor is coupled to the shaft 304c, which rotates based on magnetic interactions between the field magnets and the armature.

In some examples, the power source 304b is a turbine that extracts thermal energy of the working fluid in the TTB 302 to generate mechanical power. Such a configuration includes multiple sequential stages of rotating rotor blades and stationary stator blades that generate mechanical power based on the kinetic and thermal energies of the working fluid. In some examples, the TTB pump 304 includes a separate motor coupled to the shaft 304c in conjunction with the power source 304b (e.g., turbine) to supplement the power available to the compressor 304a. In some examples, the power source 304b is configured in another manner to provide power to the compressor 304a that corresponds with a certain pressure output of the TTB pump 304.

The TMS 102 includes one or more heat source exchangers 306 arranged along the thermal transport bus 302. More specifically, the heat source exchangers 306 are fluidly coupled to the thermal transport bus 302 such that the working fluid flows through the heat source exchangers 306. In some examples, the heat source exchangers 306 transfer heat from fluids supporting the operation of the aircraft 10 to the working fluid, which cools the fluids supporting the operation of the aircraft 10 and heats the working fluid. Although two heat source exchangers 306 are illustrated in FIG. 3, the TMS 102 of FIGS. 1-3 can include a single heat source exchanger 306 or multiple (e.g., two, three, five, etc.) heat source exchangers 306.

The heat source exchangers 306 can correspond to heat exchangers for cooling a fluid to support the operation of the aircraft 10. In some examples, at least one of the heat source exchangers 306 is coupled to a lubrication system of the engine 100. Thus, the heat source exchanger 306 can transfer heat from the oil lubricating the engine 100 to the working fluid. In some examples, at least one of the heat source exchangers 306 is coupled to a cooling system of the engine 100. Thus, the heat source exchanger 306 can transfer heat from the cooling air bled from the compressor section 122 (or a compressor discharge plenum) of the engine 100 to the working fluid. In some examples, the heat source exchangers 306 correspond to another manner of cooling a fluid supporting the operation of the aircraft 10.

Furthermore, the TMS 102 includes a plurality of heat sink exchangers 308 arranged along the thermal transport bus 302. More specifically, the heat sink exchangers 308 are fluidly coupled to the thermal transport bus 302 such that the working fluid flows through the heat sink exchangers 308. In some examples, the heat sink exchangers 308 transfer heat from the working fluid to other fluids supporting the operation of the aircraft 10, which heats the other fluids supporting the operation of the aircraft 10 and cools the working fluid. Although two heat sink exchangers 308 are illustrated in FIG. 3, the TMS 102 of FIGS. 1-3 can include a single heat sink exchanger 308 or multiple (e.g., two, three, five, etc.) heat sink exchangers 308.

The heat sink exchangers 308 can correspond to heat exchangers for heating a fluid to support the operation of the aircraft 10. In some examples, at least one of the heat sink exchangers 308 is coupled to a fuel system of the engine 100. Thus, the heat sink exchanger 308 can transfer heat from the working fluid to the fuel flowing though the fuel supply flowline 170 of the engine 100 of FIG. 2. In some examples, such as in FIGS. 2 and 3, at least one of the heat sink exchangers 308 contacts the first portion 156 of the air 152 flowing through the bypass airflow passage 120 of the engine 100. Thus, the heat exchanger 308 can transfer heat from the working fluid to the first portion 156 of the air 152 flowing through the bypass airflow passage 120.

The TMS 102 of FIG. 3 includes one or more bypass conduits 310 to allow the working fluid to circumvent the heat source exchangers 306 or the heat sink exchangers 308. As shown, each of the bypass conduits 310 is fluidly coupled to the thermal transport bus 302 such that at least a portion of the working fluid can bypass the heat source exchangers 306 or the heat sink exchangers 308. Furthermore, the TMS 102 includes one or more heat source valves 312 to cause a portion of the working fluid to enter the bypass conduits 310 and circumvent one or more of the heat source exchangers 306. The TMS 102 also includes one or more heat sink valves 314 to cause a portion of the working fluid to enter the bypass conduits 310 and circumvent one or more of the heat sink heat exchangers 308. The heat source valves 312 and the heat sink valves 314 are fluidly coupled to the thermal transport bus 302 and the corresponding bypass conduits 310. Furthermore, the heat source valves 312 and the heat sink valves 314 can be moved between fully and/or partially opened and/or closed positions to selectively occlude the flow of heat exchange through the bypass conduit 310.

In some examples, the heat source valve 312 is opened to allow a portion of the working fluid to enter the bypass conduit 310, circumvent the heat source exchanger 306, and reduce the temperature and pressure of the working fluid within the TTB 302 (e.g., to inhibit accelerated wear of the TTB 302). In some examples, the heat sink valve 314 is opened to allow a portion of the working fluid to enter the bypass conduit 310, circumvent the heat sink exchanger 308, and increase the temperature and pressure of the working fluid within the TTB 302 (e.g., to improve the heat transfer capability of the working fluid). As shown in FIG. 3, each heat source exchanger 306 and each heat sink exchanger 308 has a corresponding bypass conduit 310. In some examples, other numbers of heat source exchangers 306 and/or heat sink exchangers 308 can have a corresponding bypass conduit 310. In some examples, the heat source valves 312 and the heat sink valves 314 are hydraulically controlled based on the pressure of the working fluid within the thermal transport bus 302. Thus, for example, when the pressure of the heat exchange fluid satisfies a certain pressure threshold, the heat source valve(s) 312 opens to cause a portion of the working fluid to bypass the heat source exchanger(s) 306.

Certain relationships discovered unexpectedly by the inventors, after constructing and running several TMS systems and jet engines as described above, are now discussed. These relationships are described in connection with the TTB pump 304 illustrated in FIG. 3 and the engine 100 of FIGS. 1 and 2. It will be appreciated that these relationships can be used to design TTB pumps that can be implemented in the TMS 102 of FIGS. 1-3, the engine 100 of FIGS. 1-2, or another similar TMS or engine. Among other advantages, the discovered relationships identify TTB pumps that improve the SFC for certain engine thrust classes without falling outside the scope of benefits to SFC when implementing the relationships set forth below for selecting or designing a pump.

Through designing and constructing several engines and TTB pump, the inventors of the present disclosure discovered that a TTB pump can be designed to generate a pump power of a desired size based on a thrust class such that the SFC of a gas turbine engine in the thrust class is improved. Prior to this discovery, the inventors proceeded to design various TTB pumps that generate differing pump powers and included differing rotor diameters while determining an effectiveness of the TTB pumps to improve the SFC for differing thrust classes, as explained earlier. In the course of designing the various TTB pumps, the inventors discovered that a relationship between i) pump power of the TTB pump and ii) fuel flow rate for engines during cruise conditions results in a compact and lightweight TTB pump design (relative to engine size) to produce fuel consumption benefits. Relatedly, the inventors discovered unexpectedly that a relationship exists between i) a pump rotor diameter and ii) fuel flow rate to provide a radially compact pump and producing fuel consumption benefits (i.e., lower SFC). The inventors discovered that when applying one or both of these relationships to the pump design a lower SFC for an aircraft thrust-producing gas turbine engine can be realized, while avoiding a TTB pump that is larger and/or heavier than needed.

The unexpected discovery between a pump mass flow rate (mass flow rate of the working fluid exiting the TTB pump) and aircraft fuel mass flow rate (mass flow rate of the fuel injected into the combustion chamber) identifies a pump power and rotor diameter suited for a given engine thrust class. The TTB pump designs selected neither oversize nor undersize the pump for a given engine thrust class and provide desired SFC benefits. The disclosed relationships also eliminate TTB pump designs that are inefficient, such as TTB pumps that provide too little SFC benefit or TTB pump that are too large for a given engine thrust class.

The disclosed relationships enable the TTB pump to pressurize the working fluid to a mass flow rate that improves the SFC of an engine while maintaining an efficient size of the TTB pump. Some example TTB pump embodiments disclosed below in connections with FIGS. 6 and 7 can increase the pressure of the working fluid to counteract a pressure drop across the TMS. Furthermore, some example TTB pump embodiments disclosed herein can improve SFC while accounting for an effectiveness of a heat sink exchanger coupled to the TTB and a fuel supply line, the type of working fluid used in the TTB (e.g., supercritical carbon dioxide (sCO2), liquid helium (He), helium-xenon, etc.), the type of fuel used in the aircraft (e.g., hydrocarbon fuel (Jet-A), hydrogen fuel (H2), etc.), the efficiency of the gas turbine engine, etc.

Figure 4:
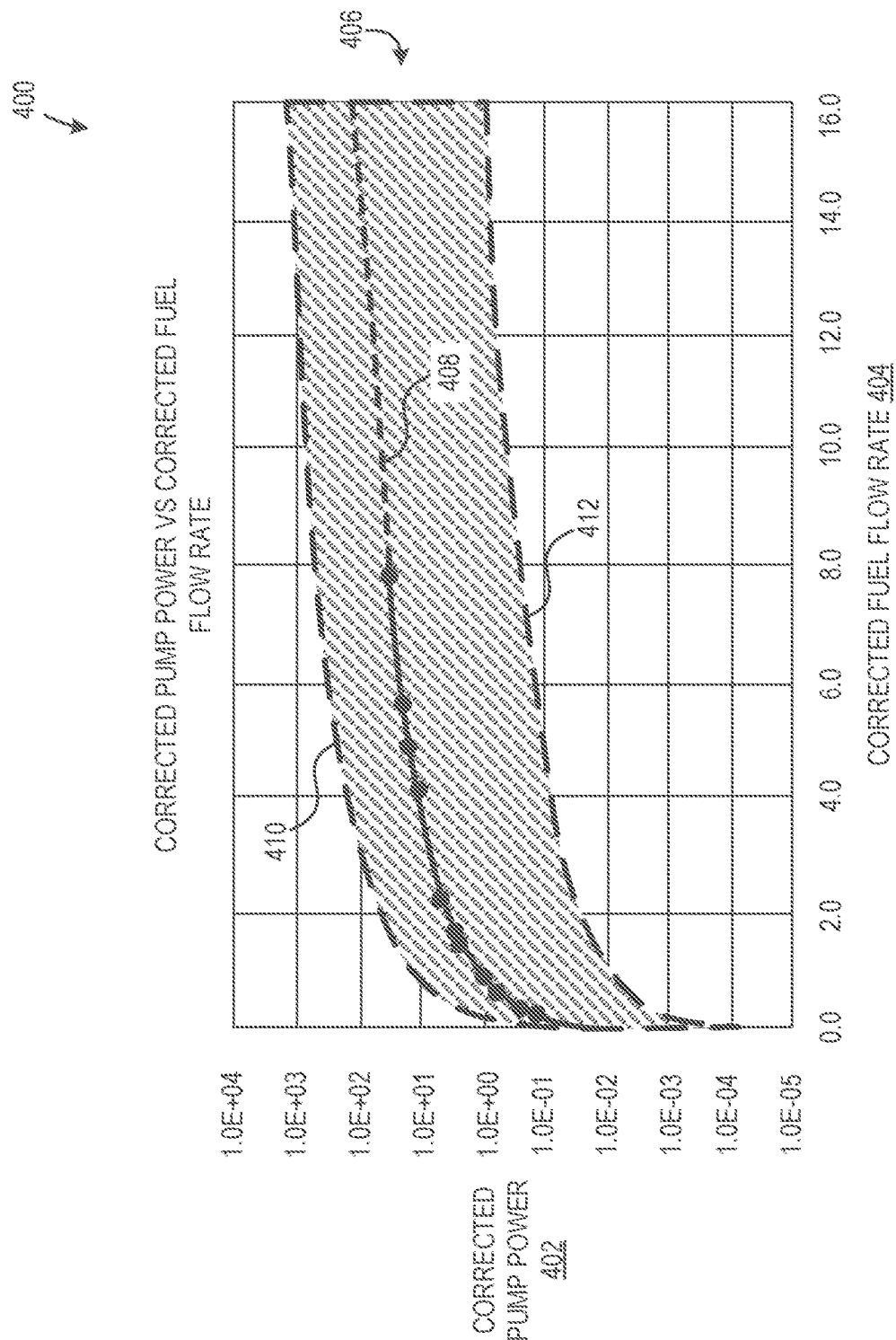
FIG. 4 is a graph that illustrates a relationship between corrected pump power of an example thermal transport bus pump and corrected fuel flow rate of the example gas turbine engine of FIG. 2 in accordance with teachings disclosed herein.

Referring now to FIG. 4, there is shown in graphical form the aforementioned discovery, which reveals a relationship between the properties of a pressurized working fluid in a thermal transport bus (TTB) and fuel properties for fuel consumed by an aircraft thrust-producing gas turbine engine. The inventors discovered this relationship after developing several embodiments considering different types, sizes, and performance characteristics of pumps for a variety of engine thrust classes. The fuel-burn benefit to selecting the right size pump for a particular engine size, i.e., lower SFC, could not be realized if the demand for working fluid pressure for heat transfer was not carefully matched to the fuel rate and volume, and temperature environment of a particular engine during operation (cruise conditions). A pump for the working fluid that was either oversized (capable of providing more pumping power than needed top transfer heat to the fuel) or undersized (not capable of enabling efficient heat transfer from the working fluid to the fuel) would result in unsatisfactory improvement in SFC for the gas turbine engine during aircraft cruise conditions.

FIG. 4 shows a first graph 400 that relates a corrected pump power 402 (e.g., Y-axis) and a corrected fuel flow rate 404 (e.g., X-axis). The corrected fuel flow rate 404 is representative of engine thrust classes at cruise flight operations. In the example of FIG. 3, the corrected pump power 402 is a pump power output for the TTB pump 304 normalized based on properties (specific heat capacity and density) of water and the chosen working fluid for the TTB 302. In the example of FIG. 2, the corrected fuel flow rate 404 is a rate of fuel consumption for the gas turbine engine 100 of FIGS. 1 and 2 normalized based on the properties (specific heat capacity) of the fuel (e.g., Jet-A, H2, etc.) and the chosen working fluid. The inventors of the present disclosure discovered that a first design space 406 (shaded area) of FIG. 4 represents a range of TTB pump designs that were found to efficiently improve the SFC across various engine thrust classes. The first design space 406 defines ranges of corrected pump powers that can provide a working fluid (e.g., sCO2, liquid helium, helium-xenon, etc.) at a mass flow rate that effectively heats the fuel for a given corrected fuel flow rate. Through their work, the inventors discovered that when the corrected pump power of the TTB pump 304 does not correspond to the first design space 406, the TTP pump 304 is either too small to provide an SFC benefit for the given engine thrust class or is too big to efficiently improve the SFC without being oversized.

The Y-axis of the first graph 400 represents the corrected pump power 402 of the TTB pump 304 and has dimensional units of horsepower (HP). During operation, the TTB pump 304 generates a pump power, $P_{pump}$, to pressurize the working fluid to a pressure head in the TTB 302. The corrected pump power 402 represents a normalized pump power that the TTB pump 304 can generate to pressurize water to the same pressure head in the TTB 302. The pump power, $P_{pump}$, is normalized to the corrected pump power, or POW. The inventors discovered that the corrected pump power, POW, is more suitable to define the first design space 406 than the pump power, $P_{pump}$, based on the view that the POW does not vary as drastically when different working fluids are considered for the TTB pump 304 design and/or when different working fluid properties are used in the pump power, $P_{pump}$, calculation. Fluid properties associated with the working fluid and implemented in the relationships expressed in FIG. 4 and in further respects below include a first specific heat capacity, $c_{p\_pump}$, and a first density, $\rho_{pump}$. Fluid properties associated with water and implemented in the disclosed relationships further include a second specific heat capacity, $c_{p\_water}$, and a second density, $\rho_{water}$. A corrected pump power, POW, is found from (1):

$$POW = \frac{P_{pump}}{\left(\frac{c_{p\_pump}}{c_{p\_water}}\right)\left(\frac{\rho_{water}}{\rho_{pump}}\right)^2}. \qquad (1)$$

The X-axis of the first graph 400 in FIG. 4, representing a corrected fuel flow rate 404, has dimensional units of pounds-mass per second (lbm/s). The corrected fuel flow rate 404 represents properties of engines across a variety of thrust classes. It was found to account well for differences among engines of differing thrust classes. During cruising operations, the engine 100 burns fuel at a fuel flow rate to generate an engine power, $P_{engine}$. When a fuel is combusted, the chemical reaction releases energy corresponding to a net heat of combustion, $NHC_{fuel}$. It was found that a fuel flow rate for the engine 100 can be approximated well by a ratio of the engine power, $P_{engine}$, to the net heat of combustion of the fuel, $NHC_{fuel}$. This fuel flow rate is normalized to provide a corrected fuel flow rate, FFR, using properties of the fuel in the engine 100 and the working fluid in the TTB 302. The inventors discovered that the corrected fuel flow rate, FFR, can more accurately account for variations in engine thrust class than the fuel flow rate because the corrected fuel flow rate FFR, does not vary as drastically when different working fluids are used to transfer heat to the fuel and/or when different fuels are used to power the engine, e.g., engine 100. Fluid properties associated with the fuel are referred to as a third specific heat capacity, $c_{p\_fuel}$, and a third density, $\rho_{fuel}$. A corrected fuel flow rate, FFR, is found from (2):

$$FFR = \left(\frac{P_{engine}}{NHC_{fuel}}\right)\left(\frac{c_{p\_fuel}}{c_{p\_pump}}\right). \qquad (2)$$

Graph 400 of FIG. 4 identifies a baseline corrected pump power curve 408 (baseline curve 408). TTB pumps that generate a corrected pump power POW and fall along the baseline curve 408 can provide an SFC benefit for the given engine thrust class (represented by the associated corrected fuel flowrate, FFR). The baseline curve 408 of FIG. 4 is expressed as follows:

$$POW=FFR^{5/3} \qquad (3).$$

In developing the embodiments of the first design space 406, the inventors found that baseline operating curves that produce the desired SFC benefit while avoiding an oversized (or undersized) pump can vary between an upper limit corrected pump power curve 410 (upper curve 410) and a lower limit corrected pump power curve 412 (lower curve 412). The upper curve 410 of FIG. 4 is expressed as follows:

$$POW=12*FFR^{5/3} \qquad (4).$$

The lower curve 412 of FIG. 4 is expressed as follows:

$$POW=0.008*FFR^{5/3} \qquad (5).$$

The first design space 406 is defined as follows:

$$0.008 \leq POW/FFR^{5/3} \leq 12 \qquad (6).$$

Figure 5:
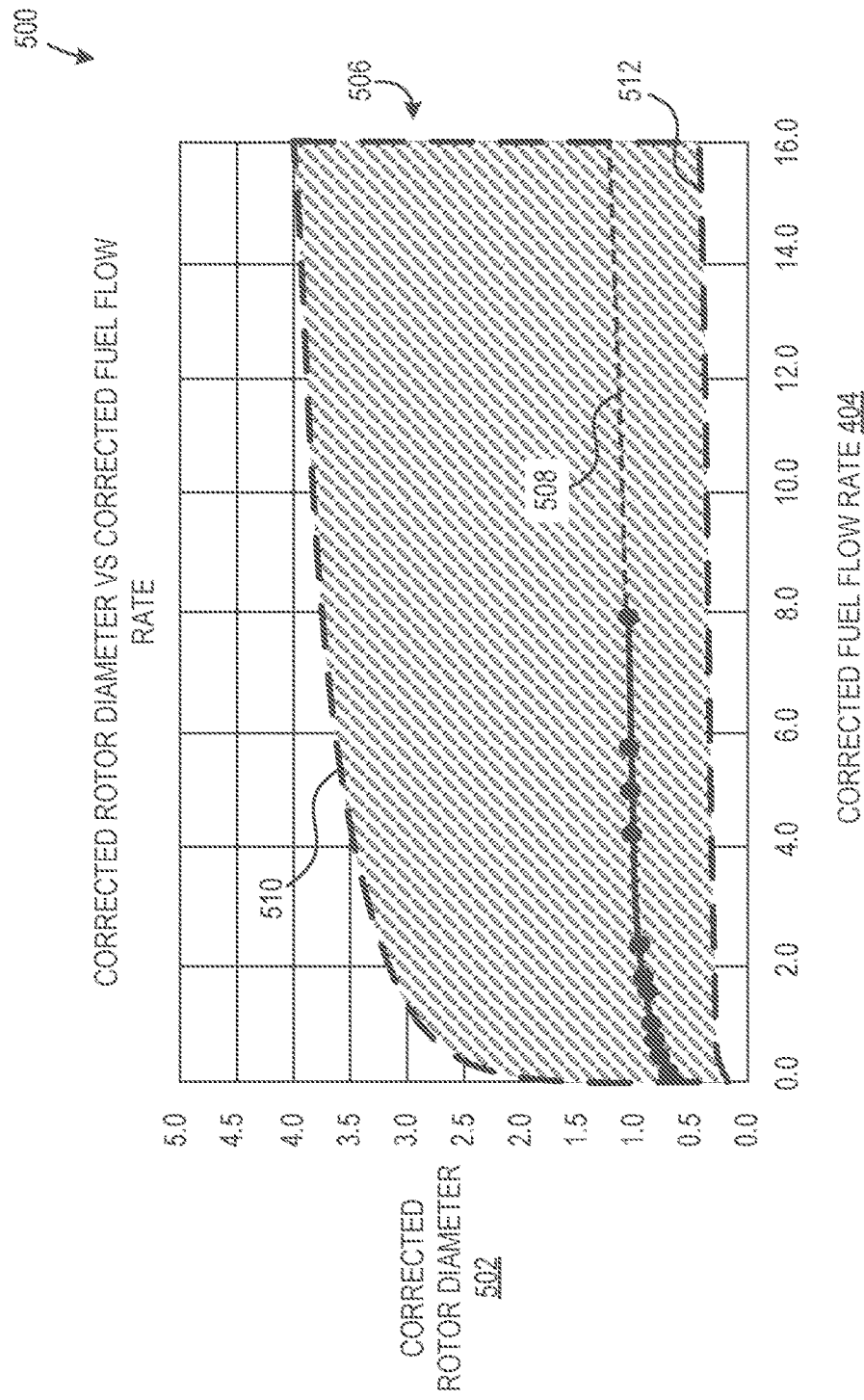
FIG. 5 is a graph that illustrates a relationship between corrected rotor diameter of the example thermal transport bus pump and corrected fuel flow rate of the example gas turbine engine of FIG. 2.

FIG. 5 shows a second graph 500 that relates a corrected rotor diameter 502 (e.g., Y-axis) and the corrected fuel flow rate 404 (e.g., X-axis). The corrected rotor diameter 502 is an exit diameter of a most upstream rotor of the TTB pump 304 of FIG. 3 normalized based on the properties (specific heat capacity) of water and the working fluid in the TTB 302 (FIG. 3). The inventors discovered that a second design space 506 of FIG. 5 properly represents a range of TTB pump designs that efficiently improve the SFC of various engine thrust classes. The second design space 506 defines ranges of rotor diameters that can provide a working fluid (e.g., sCO2, liquid helium, helium-xenon, etc.) at a mass flow rate that effectively heats the fuel for a given corrected fuel flow rate. Through their work in developing the embodiments of the second design space 506, the inventors discovered that when an exit rotor diameter of the TTB pump 304 does not correspond to the second design space 506, the TTP pump 304 is either too small to provide an SFC benefit for the given engine thrust class or is too big to efficiently improve the SFC without being oversized.

The Y-axis of the second graph 500 representing the corrected rotor diameter 502 has dimensional units of inches. During operation, the TTB pump 304 rotates at least one rotor (e.g., centrifugal impeller, axial rotor, or screw compressor) having an exit rotor diameter, $D_{rotor}$, to pressurize the working fluid to a pressure head in the TTB 302. The corrected rotor diameter, ERD, represents a normalized exit rotor diameter for the TTB pump 304 rotor. A normalized exit rotor diameter is a diameter of the rotor for the chosen pump (e.g., axial, centrifugal, single or multi-stage) that would produce the equivalent desired pressure head if water were instead used as the pumped fluid. In some examples, TTB pump 304 includes a single-stage centrifugal compressor having an impeller, wherein the rotor diameter, $D_{rotor}$, corresponds to an exit diameter of the impeller. In some examples, the TTB pump 304 includes a multistage centrifugal compressor having a plurality of impellers, wherein the rotor diameter, $D_{rotor}$, corresponds to an exit diameter of a most upstream impeller of the plurality of impellers. In some examples, the TTB pump 304 includes an axial compressor having a plurality of rotors, wherein the rotor diameter, $D_{rotor}$, corresponds to an exit diameter of a most upstream rotor of the plurality of rotors.

The rotor diameter, $D_{rotor}$, is normalized to the corrected rotor diameter, ERD, based on the properties of water and the working fluid. The inventors discovered that the corrected rotor diameter, ERD, is more suitable to define the second design space 506 than the rotor diameter, $D_{rotor}$, because the corrected rotor diameter, ERD, does not vary as drastically when different working fluids are considered for the TTB pump 304 design. Fluid properties used for ERD include the first specific heat capacity, $c_{p\_pump}$, and the second specific heat capacity, $c_{p\_water}$. A corrected rotor diameter, ERD, is found from (7):

$$ERD = \left(\frac{c_{p\_pump}}{c_{p\_water}}\right)^{0.25} * D_{rotor}. \qquad (7)$$

The second graph 500 of FIG. 5 identifies a baseline corrected rotor diameter curve 508 (baseline curve 508). TTB pumps having a corrected rotor diameter, ERD, that fall along the baseline curve 508 (indicated by the dots along curve 508) can provide an SFC benefit for the given engine thrust class (represented by the associated corrected fuel flowrate, FFR). The baseline curve 508 of FIG. 5 is expressed as follows:

$$ERD=0.88*FFR^{0.1} \qquad (8).$$

In designing embodiments within the second design space 506, the inventors found that rotor diameter baseline operating curves producing a desired SFC benefit (and while avoiding an oversized pump) can vary between an upper limit corrected rotor diameter curve 510 (upper curve 510) and a lower limit corrected rotor diameter curve 512 (lower curve 512). The upper curve 510 of FIG. 5 is expressed as follows:

$$ERD=3.0*FFR^{0.1} \qquad (9).$$

The lower curve 512 of FIG. 5 is expressed as follows:

$$ERD=0.4*FFR^{0.1} \qquad (10).$$

The second design space 506 is defined as follows:

$$0.4 \leq ERD/FFR^{0.1} \leq 3.0 \qquad (11).$$

Referring to the baseline curves 408, 508, a larger corrected fuel flow rate 404 is associated with a larger corrected pump power 402 and/or a larger corrected rotor diameter 502 to improve an SFC for the corresponding engine thrust class. However, in some examples, for a given engine thrust class (corrected fuel flow rate 404), the TTB pump 304 may be designed with a higher or lower pump power or rotor diameter based on various performance factors of the TTB pump 304, the TMS 102, the aircraft 10, and/or the gas turbine engine 100 as described below. In some examples, the first and second design spaces 406, 506, in which desirable TTB pump 304, power source 304b designs (corrected pump powers, POW, and/or compressor 304a designs (corrected rotor diameters, ERD) lie, are bound in the X-axis by 0.05≤FFR≤16 lbm/s. In some other examples, the first and second design spaces 406, 506 are bound in the X-axis by 0.25≤FFR≤15 lbm/s. In other examples, the first and second design spaces 406, 506 are bound in the X-axis by 0.05≤FFR≤3.5 lbm/s for lower thrust class engines. In other examples, the first and second design spaces 406, 506 are bound in the X-axis by 3.5≤FFR≤16 lbm/s for higher thrust class engines. An effective TTB pump 304 (e.g., compressor 304a, power source 304b, etc.) can be designed and/or constructed to provide the desired mass flow rates of the working fluid while remaining below an inefficiently large pump size, to arrive at an improved heat transfer to the fuel upstream of the combustion chamber that provides an SFC benefit for a given engine thrust class.

TTB pump embodiments (disclosed below) defined by the first and/or second design spaces 406, 506 can implement the TTB pump 304 of FIG. 3. The embodiments indicated along the baseline curve 408 in FIG. 4 represent specific examples of certain TTB pump configurations with corrected pump powers, POW, for certain engine architectures. The embodiments indicated along the baseline curve 508 represent TTB pumps with corrected rotor diameters, ERD, for the same or similar engine architectures. Other embodiments that do not fall along the baseline curves 408, 508 but do fall within the first and second design spaces 406, 506 (e.g., embodiments that satisfy the relationship in (5) or (10)) can also be appropriate for a given engine design and thrust class. For example, a TTB pump embodiment having a pump power, POW, that corresponds to the upper curve 410 of the first design space 406 (e.g., embodiments that satisfy the relationship in (4)) outputs a larger pressure and flow rate to provide a certain SFC benefit to the engine without becoming oversized. Example engine architectures that can influence the designs of TTB pump embodiments, although without departing from the scope of invention and benefitting from the relationships described above, are provided below.

As illustrated in FIGS. 4 and 5, the corrected pump power, POW, and corrected rotor diameter, ERD, can be determined based on the corrected fuel flow rate, FFR, for a given thrust class. Thus, the engine power, $P_{engine}$, can be used as a guide to determine the pump power, $P_{pump}$, and/or the rotor diameter, $D_{impeller}$, of the TTB pump 304 that can improve the SFC of the engine 100.

An effective corrected pump power, POW, of the TTB pump 304 having an efficiently sized power source 304b (e.g., electric motor, turbine, etc.) to improve the SFC of the engine 100 is defined by expressions (1)-(6) above. The ranges of physical properties or characteristics of the engine and TMS in which these relationships are defined and valid are set forth below in TABLE 1:

TABLE 1

Parametric Variable Ranges

| Variable (Units) | Description | Range |
|---|---|---|
| FFR (pounds-mass per second (lbm/s)) | Fuel flow rate normalized for working fluid in TMS; represents engine thrust class | $0.05 \leq FFR \leq 16$ |
| $P_{engine}$ (foot-pounds-force per second (ft * lbf/s)) | Mechanical power of turbine engine | $1.0e6 < P_{engine} < 1.0e8$ |
| $P_{pump}$ (HP) | Mechanical power of pump in thermal transport bus | $0.0020 < P_{pump} < 1200$ |
| $NHC_{fuel}$ (foot-pounds-force per pound-mass (ft * lbf/lbm)) | Net heat of combustion of fuel | $1.0e6 < NHC_{fuel} < 1.0e8$ |
| $C_{p\_fuel}$ (foot-pounds-force per pound-mass times degree Rankine (ft * lbf/lbm * R)) | Specific heat capacity of fuel at constant pressure | $100 < C_{p\_fuel} < 5000$ |
| $C_{p\_pump}$ (ft * lbf/lbm * R) | Specific heat capacity of working fluid at constant pressure and at pump inlet | $100 < C_{p\_pump} < 5000$ |
| $\rho_{pump}$ (pounds-mass per cubic foot (lbm/ft³)) | Density of working fluid at pump inlet | $0.1 < \rho_{pump} < 100$ |

An effective corrected rotor diameter, ERD, of the TTB pump 304 having an efficiently sized compressor 304a (e.g., rotor, impeller, etc.) to improve the SFC of the engine 100 is defined by expressions (2) and (7)-(11) above. The ranges of physical properties or characteristics of the engine and TMS in which these relationships are defined and valid are set forth below in TABLE 2:

TABLE 2

Parametric Variable Ranges

| Variable (Units) | Description | Range |
|---|---|---|
| FFR (lbm/s) | Fuel flow rate normalized for working fluid in TMS; represents engine thrust class | $0.05 \leq X \leq 16$ |
| $P_{engine}$ (HP) | Mechanical power of turbine engine | $1.0e6 < P_{engine} \leq 1.0e8$ |
| $D_{rotor}$ (in) | Exit diameter of most upstream rotor in pump | $0.3 < D_{rotor} < 4.4$ |
| $NHC_{fuel}$ (ft * lbf/lbm) | Net heat of combustion of fuel | $1.0e6 < NHC_{fuel} < 1.0e8$ |
| $C_{p\_fuel}$ (ft * lbf/lbm * R) | Specific heat capacity of fuel at constant pressure | $100 < C_{p\_fuel} < 5000$ |

TABLE 2-continued

Parametric Variable Ranges

| Variable (Units) | Description | Range |
|---|---|---|
| $C_{p\_pump}$ (ft * lbf/lbm * R) | Specific heat capacity of working fluid at constant pressure and at pump inlet | $100 < C_{p\_pump} < 5000$ |
| $\rho_{pump}$ (lbm/ft³) | Density of working fluid at pump inlet | $0.1 < \rho_{pump} < 100$ |

In addition to the foregoing relationships identifying pump properties and characteristics of the fluids and engine properties where these relationships apply, further considerations can be made when designing a TTB pump 304. Such considerations include performance factors of the TMS 102 and/or the gas turbine engine 100. Referring to these embodiments, the various TTB pump embodiments (disclosed below) conform to size and performance bounds set within the first and second design spaces 406, 506 while also satisfying performance factors mentioned below. For example, the pressure drop across the TMS 102 can influence the selection of a disclosed TTB pump. Certain designs or configurations of the TMS 102 can influence the pressure drop across the system and define the required pressure increase (or pressure differential) of the TTB pump 304. In some examples, the length of the TTB 302, the number and sizes of the heat source exchangers 306, and/or the number and sizes of the heat sink exchangers 308 can affect the pressure differential the TTB pump 304 needs to provide. For example, a large number (e.g., five, ten, etc.) of heat sink exchangers 308 in the TMS 102 can cause a significant pressure decrease across the TTB 302, which requires the TTB pump 304 to provide a larger pressure differential. Some TTB pump embodiments disclosed below (FIGS. 6 and 7) can overcome certain pressure drops in the TMS while improving the SFC and complying with the first and second design spaces 406, 506. Through the design of these TTB pumps, the inventors unexpectedly discovered the parametric relationships disclosed above.

Figure 6:
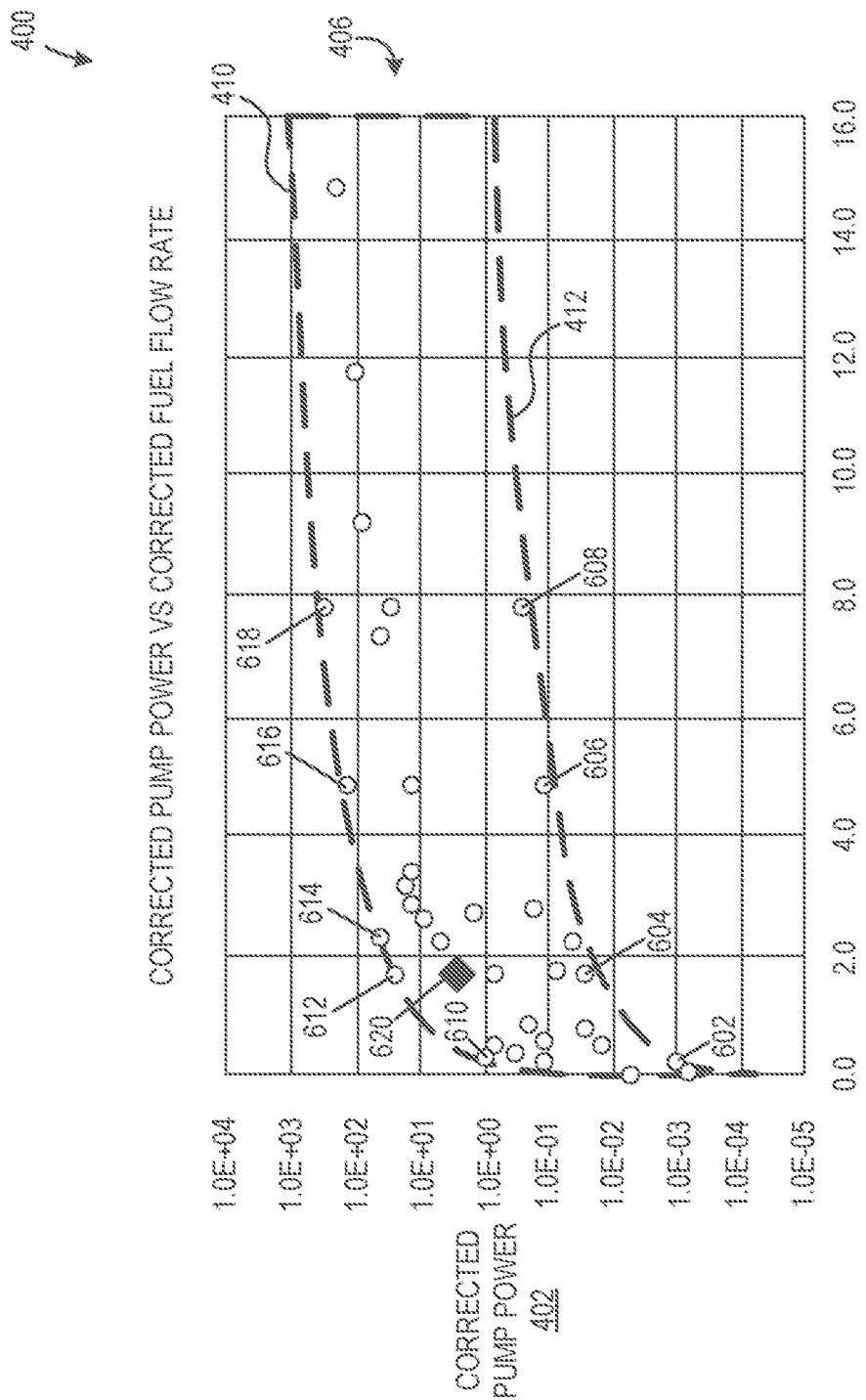
FIG. 6 is the graph of FIG. 4 that illustrates example thermal transport bus pump embodiments in accordance with teachings disclosed herein.
Figure 7:
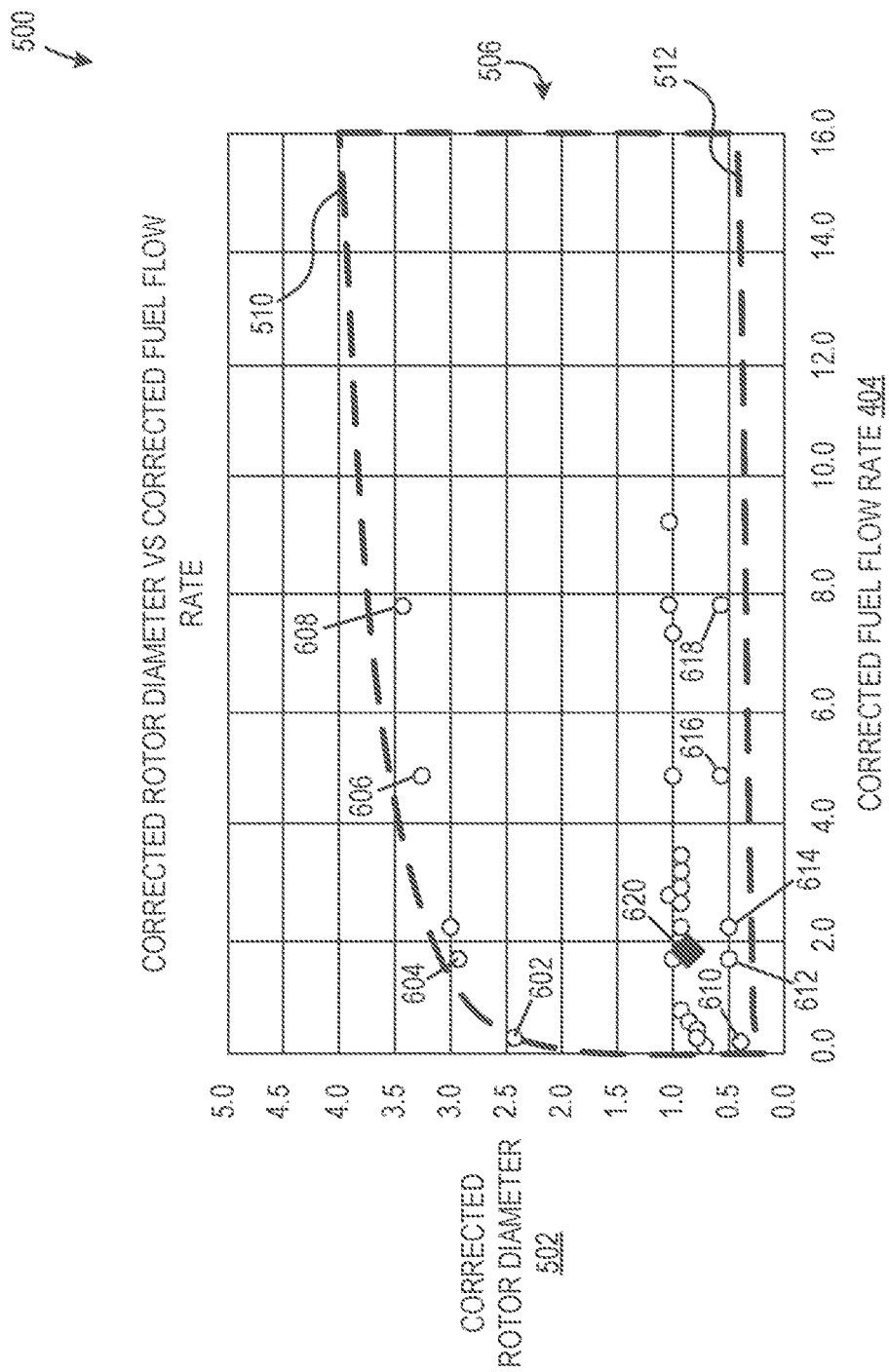
FIG. 7 is the graph of FIG. 5 that illustrates the example thermal transport bus pump embodiments in accordance with teachings disclosed herein.

FIGS. 6 and 7 illustrate various examples of TTB pumps that fall within the first and second design spaces 406, 506 disclosed herein. Such TTB pump embodiments can improve SFC and consider ranges of pressure differentials across the TMS. FIG. 6 illustrates the first graph 400 that relates the corrected pump power 402 (e.g., Y-axis) and the corrected fuel flow rate 404 (e.g., X-axis). The first graph 400 of FIG. 6 identifies specific TTB pump embodiments discovered by the inventors within the first design space 406.

FIG. 7 illustrates the second graph 500 that relates the corrected rotor diameter 502 (e.g., Y-axis) and the corrected fuel flow rate 404 (e.g., X-axis). The second graph 500 of FIG. 7 identifies specific TTB pump embodiments within the second design space 506.

FIG. 6 shows example corrected pump power, POW, values corresponding to various TTB pump embodiments disclosed with respect to the first design space 406. FIG. 7 shows example corrected rotor diameter, ERD, values corresponding to the various TTB pump embodiments disclosed with respect to the second design space 506. The TTB pump embodiments shown reflect engines associated with certain engine thrust classes. Different example engines (e.g., engine 100, etc.) can be associated with different thrust classes based on the corrected fuel flow rate, FFR, at which the engine consumes the fuel. In some examples, a first engine 100a, a second engine 100b, a third engine 100c, a fourth engine 100d, and a fifth engine 100e burn Jet-A fuel at certain corrected fuel flow rates. In some examples, a sixth engine 100f, a seventh engine 100g, an eighth engine 100h, a ninth engine 100i, and a tenth engine 100j burn hydrogen (H2) fuel at certain corrected fuel flow rates. TABLE 3, below, describes the characteristics of engines 100a-100j (at cruise flight operations) and fuels associated with example TTB pump embodiments disclosed herein.

TABLE 3

Engine and Fuel Values

| Engine | Fuel | Thrust lbf | Cruise Speed feet per second (ft/s) | $NHC_{fuel}$ ft*lbf/lbm | $c_{p\_fuel}$ ft*lbf/ lbm*R | $P_{engine}$ ft*lbf/s | FFR lbm/s |
|---|---|---|---|---|---|---|---|
| 100a | Jet-A | 4019 | 764.62 | 1.4453E+07 | 427.48 | 3.0732E+06 | 0.2653 |
| 100b | Jet-A | 2613 | 764.62 | 1.4453E+07 | 427.48 | 1.9979E+07 | 1.7246 |
| 100c | Jet-A | 35000 | 755.50 | 1.4453E+07 | 427.48 | 2.6443E+07 | 2.2825 |
| 100d | Jet-A | 68600 | 822.94 | 1.4453E+07 | 427.48 | 5.6454E+07 | 4.8730 |
| 100e | Jet-A | 110000 | 824.77 | 1.4453E+07 | 427.48 | 9.0724E+07 | 7.8311 |
| 100f | H2 | 4019 | 764.62 | 4.7440E+07 | 2658.58 | 3.0732E+06 | 0.5026 |
| 100g | H2 | 23300 | 755.50 | 4.7440E+07 | 2658.58 | 1.7603E+07 | 2.8789 |
| 100h | H2 | 25618 | 764.62 | 4.7440E+07 | 2658.58 | 1.9588E+07 | 3.2035 |
| 100i | H2 | 68600 | 822.94 | 4.7440E+07 | 2658.58 | 5.6454E+07 | 9.2327 |
| 100j | H2 | 110000 | 824.77 | 4.7440E+07 | 2658.58 | 9.0724E+07 | 14.838 |

FIG. 6 shows example corrected pump power, POW, values for TTB pump embodiments with respect to the first design space 406. The data points labelled in FIG. 6 refer to a first example TTB pump 602, a second example TTB pump 604, a third example TTB pump 606, a fourth example TTB pump 608, a fifth example TTB pump 610, a sixth example TTB pump 612, a seventh example TTB pump 614, an eighth example TTB pump 616, a ninth example TTB pump 618, and a tenth example TTB pump 620. TABLE 4, below, provides example values corresponding to the TTB pump embodiments disclosed herein. The first, second, third, and fourth TTB pumps 602-608 have corrected pump power, POW, values that define the lower curve 412 of the first design space 406. The fifth, sixth, seventh, eighth, and ninth TTB pumps 610-618 have corrected pump power, POW, values that define the upper curve 410 of the first design space 406.

FIG. 7 shows example corrected rotor diameter, ERD, values for TTB pump embodiments with respect to the second design space 506. The data points labelled in FIG. 7 refer to the same example TTB pumps 602-620 as shown in FIG. 6. The designs of the TTB pumps disclosed herein can be configured to pump various working fluids (e.g., sCO2, He, etc.) or can include larger or smaller pump powers, rotor diameters, etc. while maintaining a level of effectiveness as represented by relationships (1)-(11).

rotary screw compressors, and/or the like. As such, TTB pump embodiments of various configurations can be designed based on the disclosed relationships (1)-(11) with corrected pump powers, POW, that fall within the first design space 406 and/or corrected rotor diameters, ERD, that fall within the second design space 506. The engines 100a-100j of TABLE 3 are example engines that can be implemented in the aircraft 10 of FIG. 1 or another example aircraft, and the example TTB pump embodiments of TABLES 4 and 5 can be implemented in the example engines 100a-100j. However, the relationships disclosed herein are not limited to the engines 100a-100j represented in TABLE 3, the TTB pumps 602-620 represented in

TABLE 4

TTB Pump Embodiments and Working Fluid Values

| TTB Pump | Engine | $\rho_{pump}$ lbm/ft³ | $c_{p\_pump}$ ft*lbf/ lbm*R | $D_{rotor}$ inches | $P_{pump}$ HP | POW HP | ERD inches |
|---|---|---|---|---|---|---|---|
| 602 | 100a | 21.03 | 342.67 | 2.9923 | 0.0040 | 0.0010 | 2.4373 |
| 604 | 100b | 21.03 | 342.67 | 3.5913 | 0.1031 | 0.0266 | 2.9252 |
| 606 | 100d | 21.03 | 342.67 | 4.0260 | 0.5087 | 0.1314 | 3.2793 |
| 608 | 100e | 21.03 | 342.67 | 4.2182 | 1.1527 | 0.2978 | 3.4358 |
| 610 | 100a | 21.03 | 342.67 | 0.5321 | 3.9859 | 1.0296 | 0.4334 |
| 612 | 100b | 21.03 | 342.67 | 0.6386 | 103.0818 | 26.6273 | 0.5202 |
| 614 | 100c | 21.03 | 342.67 | 0.6549 | 173.5621 | 44.8332 | 0.5334 |
| 616 | 100d | 21.03 | 342.67 | 0.7159 | 508.7051 | 131.4047 | 0.5831 |
| 618 | 100e | 21.03 | 342.67 | 0.7501 | 1152.7491 | 297.7690 | 0.6110 |
| 620 | 100b | 21.03 | 342.67 | 1.1357 | 10.3082 | 2.6627 | 0.9250 |

The TTB pumps 602-620 as shown in TABLE 4 are configured to operate within a range of corrected pump powers, POW, to pressurize sCO2 to within a range of total pressures (PTA), such as between 1000 and 4000 pounds per square inch (psi), etc. Additional embodiments (not labelled in FIGS. 6-7) were constructed. Such TTB pump embodiments can be configured to pump sCO2, He, and/or other working fluids at a range of PTAs that can be similar to the PTAs of the TTB pumps 602-620. TABLE 5, below, provides additional example values corresponding to TTB pump embodiments disclosed herein and within the design spaces 406 and 506.

TABLE 5

TTB Pump Embodiments and Working Fluid Values

| Engine | Fluid | $\rho_{pump}$ lbm/ft³ | $c_{p\_pump}$ ft*lbf/ lbm*R | $D_{rotor}$ inches | $P_{pump}$ HP | POW HP | ERD inches |
|---|---|---|---|---|---|---|---|
| 100a | sCO2 | 21.03 | 342.67 | 0.9463 | 0.3986 | 0.1030 | 0.7708 |
| 100c | sCO2 | 21.03 | 342.67 | 1.1646 | 17.3562 | 4.4833 | 0.9486 |
| 100d | sCO2 | 21.03 | 342.67 | 1.2731 | 50.8705 | 13.1405 | 1.0370 |
| 100e | sCO2 | 21.03 | 342.67 | 1.3339 | 115.2749 | 29.7769 | 1.0865 |
| 100c | sCO2 | 21.03 | 342.67 | 3.6829 | 0.1736 | 0.0448 | 2.9998 |
| 100a | sCO2 | 8.20 | 228.02 | 1.0583 | 5.6814 | 0.3356 | 0.7786 |
| 100b | sCO2 | 8.20 | 228.02 | 1.2701 | 146.9322 | 8.6795 | 0.9344 |
| 100c | sCO2 | 8.20 | 228.02 | 1.3025 | 247.3943 | 14.6140 | 0.9582 |
| 100d | sCO2 | 8.20 | 228.02 | 1.4239 | 725.1049 | 42.8331 | 1.0475 |
| 100e | sCO2 | 8.20 | 228.02 | 1.4919 | 1643.1211 | 97.0618 | 1.0975 |
| 100a | sCO2 | 21.03 | 342.67 | 0.9613 | 2.5448 | 0.6574 | 0.7830 |
| 100b | sCO2 | 21.03 | 342.67 | 1.1372 | 54.6434 | 14.1150 | 0.9263 |
| 100c | sCO2 | 21.03 | 342.67 | 1.1515 | 63.5893 | 16.4259 | 0.9380 |
| 100d | sCO2 | 21.03 | 342.67 | 1.2934 | 324.7891 | 83.8969 | 1.0535 |
| 100e | sCO2 | 21.03 | 342.67 | 1.3552 | 735.9870 | 190.1143 | 1.1038 |
| 100a | He | 1.22 | 964.52 | 0.7121 | 2.0584 | 0.0006 | 0.7513 |
| 100b | He | 1.22 | 964.52 | 0.8546 | 53.2329 | 0.0165 | 0.9016 |
| 100c | He | 1.22 | 964.52 | 0.8764 | 89.6299 | 0.0278 | 0.9246 |
| 100d | He | 1.22 | 964.52 | 0.9581 | 262.7024 | 0.0816 | 1.0108 |
| 100e | He | 1.22 | 964.52 | 1.0038 | 595.2958 | 0.1849 | 1.0590 |
| 100a | He | 0.62 | 964.74 | 0.7120 | 64.2453 | 0.0051 | 0.7513 |
| 100b | He | 0.62 | 964.74 | 0.8545 | 1661.4986 | 0.1322 | 0.9016 |
| 100c | He | 0.62 | 964.74 | 0.8764 | 2797.5162 | 0.2226 | 0.9246 |
| 100d | He | 0.62 | 964.74 | 0.9580 | 8199.4334 | 0.6524 | 1.0108 |
| 100e | He | 0.62 | 964.74 | 1.0037 | 18580.2938 | 1.4783 | 1.0590 |

TTB pumps of the foregoing embodiments that satisfy relationships (1)-(11) can include single-stage centrifugal compressors (sometimes referred to as single-stage radial compressors), multistage centrifugal compressors (sometimes referred to as multistage radial compressors), single-stage axial compressors, multistage axial compressors, TABLE 4, or the TTB pump embodiments of TABLE 5. Rather, other TTB embodiments can be designed for other engine thrust classes based on the disclosed relationships that still fall within the first and second design spaces 406, 506 and provided the physical characteristics of the system comport with TABLE 2.

Although the TTB pump embodiments of Tables 4 and 5 are designed to pump sCO2 or He as the working fluid, other TTB pump embodiments can be designed based on the disclosed relationships to pump other working fluids (e.g., helium-xenon, water, oil, etc.). Although the example engines 100a-100j of Table 3 are designed to burn Jet-A or H2 to generate thrust, other fuels (e.g., Biodiesel, etc.) can be burned by the engines 100a-100j or other engines at a corrected fuel flow rate, FFR, that corresponds to the first and second design spaces 406, 506 developed by the inventors.

Figure 8:
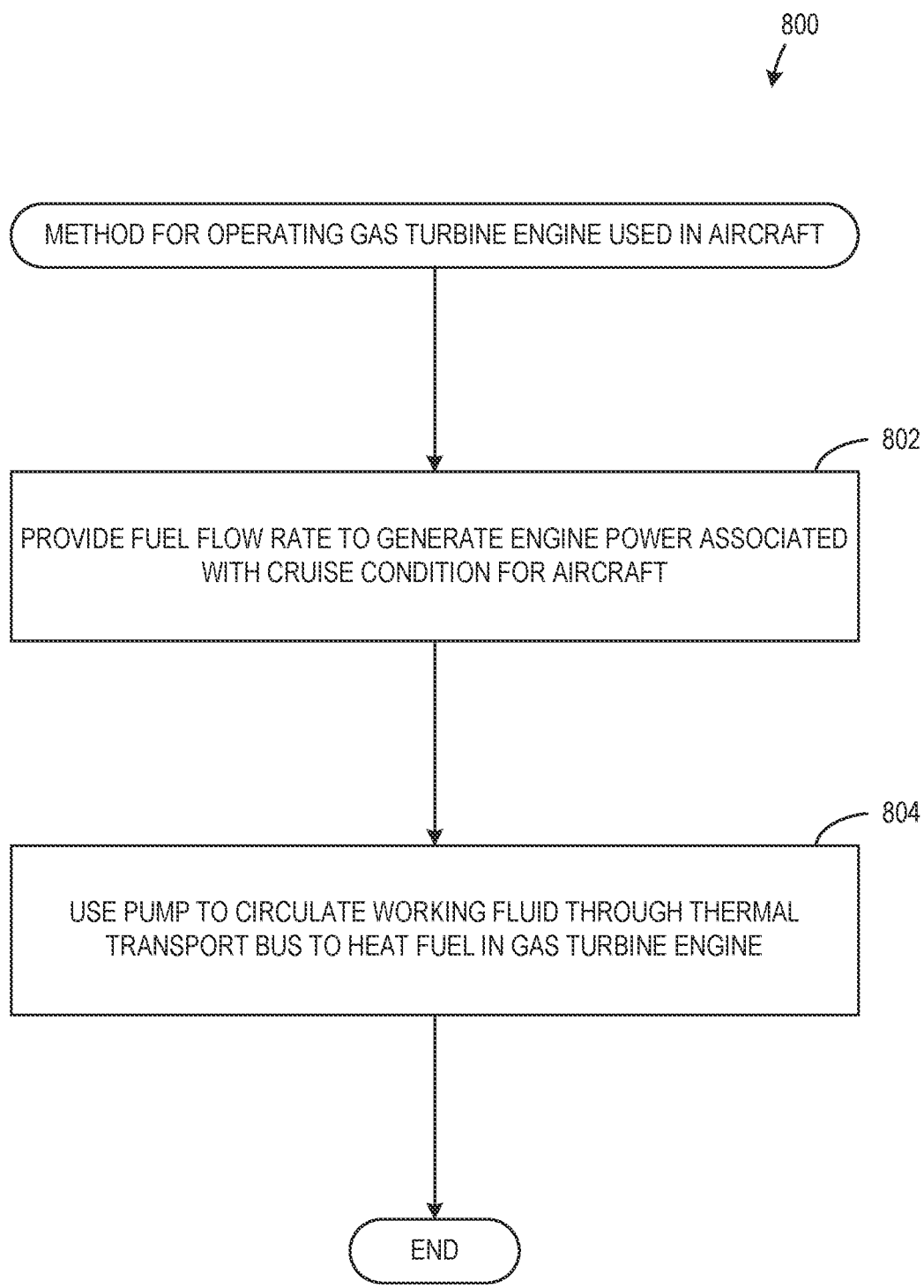
FIG. 8 is a flowchart that illustrates an example method for operating a gas turbine engine in accordance with teachings disclosed herein.

FIG. 8 is a flowchart that illustrates a method 800 for operating a gas turbine engine (e.g., engines 100a-100e, etc.) used in an aircraft in accordance with teachings disclosed herein. The method 800 ensures that a TTB pump (e.g., TTB pumps 602-620, etc.) operates at a pump power that provides an SFC benefit to the gas turbine engine during a cruise phase of flight of the aircraft (e.g., aircraft 10, etc.). The method 800 begins at block 802, at which the gas turbine engine provides a fuel flow rate to generate an engine power associated with a cruise condition for the aircraft. At block 804, the gas turbine engine uses the pump to circulate a working fluid (e.g., sCO2, etc.) through a thermal transport bus (e.g., TTB 302, etc.) to heat a fuel in the gas turbine engine. The pump generates a pump power corresponding to the parametric relationship described in connection with FIG. 4 and/or has an exit rotor diameter corresponding to the parametric relationship described in connection with FIG. 5. After block 804, the gas turbine engine continues providing the fuel flow rate and using the pump until operation of the gas turbine engine of the aircraft during cruise conditions ends.

From the foregoing, it will be appreciated that disclosed relationships enable manufacture of thermal transport bus (TTB) pumps that can pressurize a working fluid in a thermal management system (TMS) to transfer heat to fuel in an aircraft engine prior to combustion. Transference of heat to the fuel via working fluid pressurized with the TTB pumps disclosed herein can improve a specific fuel consumption (SFC) corresponding to the engine thrust class of the aircraft engine during cruise operations. Disclosed parametric relationships can be used to expedite the design or selection process of the TTB pump for a certain engine thrust class. Furthermore, the relationship between corrected pump power and engine thrust class (corrected fuel flow rate) enables manufacture of a TTB pump to operate at an effective pump power to pressurize the working fluid without being oversized. In other words, disclosed parametric relationships between corrected rotor diameter and engine thrust class enables manufacture of a TTB pump to provide an effective mass flow rate of working fluid to improve the SFC (associated with the thrust class) without being oversized. Considering the importance of limiting the additional weight to an aircraft, the parametric relationship ensures that the TTB pump is not too large so as to outweigh the performance benefits provided. Accordingly, example TTB pumps disclosed herein enable improved operability and efficiency of a turbine engine while limiting the size of the TTB pump in the TMS. In other words, disclosed parametric relationships can determine the pump power for the thrust class that results in a TTB pump that properly sized, such that the TTB pump provides an SFC benefit to engines of the thrust class without negatively affecting the weight of the engines.

Further aspects of the present disclosure are provided by the subject matter of the following clauses:

An aircraft comprising a gas turbine engine configured to burn fuel at a fuel flow rate to generate an engine power ($P_{engine}$), the fuel characterized by a first specific heat capacity ($c_{p\_fuel}$) and a net heat of combustion ($NHC_{fuel}$), and a thermal management system including a thermal transport bus configured to transfer heat from a working fluid to the fuel, the working fluid characterized by a second specific heat capacity ($c_{p\_pump}$) and a first density ($\rho_{pump}$), the thermal transport bus including a pump configured to generate a pump power ($P_{pump}$) to pressurize the working fluid in the thermal transport bus, and wherein $$POW = \frac{P_{pump}}{\left(\frac{c_{p\_pump}}{c_{p\_water}}\right)\left(\frac{\rho_{water}}{\rho_{pump}}\right)^2}, FFR = \left(\frac{P_{engine}}{NHC_{fuel}}\right)\left(\frac{c_{p\_fuel}}{c_{p\_pump}}\right),$$

$0.008 \leq POW/FFR^{5/3} \leq 12$, FFR is between 0.05 pounds-mass per second and 16 pounds-mass per second, and $\rho_{water}$ and $c_{p\_water}$ are the density and specific heat capacity of water, respectively.

The aircraft of any preceding clause, wherein the pump includes a rotor having a rotor diameter ($D_{rotor}$), and wherein $$ERD = D_{rotor}\left(\frac{c_{p\_pump}}{c_{p\_water}}\right)^{0.25},$$

and $0.4 \leq ERD/FFR^{0.1} \leq 3.0$.

The aircraft of any preceding clause, wherein FFR is between 0.05 pounds-mass per second and 3.5 pounds-mass per second.

The aircraft of any preceding clause, wherein FFR is between 3.5 pounds-mass per second and 16 pounds-mass per second.

The aircraft of any preceding clause, wherein the pump is a single-stage radial compressor.

The aircraft of any preceding clause, wherein the pump is a multistage radial compressor.

The aircraft of any preceding clause, wherein the net heat of combustion ($NHC_{fuel}$) is between 1.0e6 foot-pounds-force per pound-mass and 1.0e8 foot-pounds-force per pound-mass, and wherein the first specific heat capacity ($c_{p\_fuel}$) is between 100 foot-pounds-force per pound-mass times degree Rankine and 5000 foot-pounds-force per pound-mass times degree Rankine.

The aircraft of any preceding clause, wherein the fuel is a hydrocarbon fuel.

The aircraft of any preceding clause, wherein the fuel is hydrogen fuel.

The aircraft of any preceding clause, wherein the second specific heat capacity ($c_{p\_pump}$) is between 100 foot-pounds-force per pound-mass times degree Rankine and 5000 foot-pounds-force per pound-mass times degree Rankine, and wherein the first density ($\rho_{pump}$) is between 0.1 pounds-mass per cubic foot and 100 pounds-mass per cubic foot.

The aircraft of any preceding clause, wherein the working fluid is supercritical carbon dioxide.

The aircraft of any preceding clause, wherein the working fluid is liquid helium.

A gas turbine engine comprising a combustion section to burn fuel at a fuel flow rate to operate at an engine power ($P_{engine}$), the fuel characterized by a first specific heat capacity ($c_{p\_fuel}$) and a net heat of combustion ($NHC_{fuel}$), and a thermal transport bus pump to operate at a pump power ($P_{pump}$) based on the fuel flow rate to pump a working fluid through a thermal transport bus to heat the fuel in the gas turbine engine prior to combustion, the working fluid characterized by a second specific heat capacity ($c_{p\_pump}$) and a first density ($\rho_{pump}$), wherein $$POW = \frac{P_{pump}}{\left(\frac{c_{p\_pump}}{c_{p\_water}}\right)\left(\frac{\rho_{water}}{\rho_{pump}}\right)^2}, FFR = \left(\frac{P_{engine}}{NHC_{fuel}}\right)\left(\frac{c_{p\_fuel}}{c_{p\_pump}}\right),$$

$0.008 \leq POW/FFR^{5/3} \leq 12$, FFR is between 0.05 pounds-mass per second and 16 pounds-mass per second, and $\rho_{water}$ and $c_{p\_water}$ are the density and specific heat capacity of water, respectively.

The gas turbine engine of any preceding clause, wherein the thermal transport bus pump includes a rotor having a rotor diameter ($D_{rotor}$), and wherein $$ERD = D_{rotor}\left(\frac{c_{p\_pump}}{c_{p\_water}}\right)^{0.25},$$

and $0.4 \leq ERD/FFR^{0.1} \leq 3.0$.

The gas turbine engine of any preceding clause, wherein FFR is between 0.05 pounds-mass per second and 3.5 pounds-mass per second.

The gas turbine engine of any preceding clause, wherein FFR is between 3.5 pounds-mass per second and 16 pounds-mass per second.

The gas turbine engine of any preceding clause, wherein the net heat of combustion ($NHC_{fuel}$) is between 1.0e6 foot-pounds-force per pound-mass and 1.0e8 foot-pounds-force per pound-mass, and wherein the first specific heat capacity ($c_{p\_fuel}$) is between 100 foot-pounds-force per pound-mass times degree Rankine and 5000 foot-pounds-force per pound-mass times degree Rankine.

The gas turbine engine of any preceding clause, wherein the second specific heat capacity ($c_{p\_pump}$) is between 100 foot-pounds-force per pound-mass times degree Rankine and 5000 foot-pounds-force per pound-mass times degree Rankine, and wherein the first density ($\rho_{pump}$) is between 0.1 pounds-mass per cubic foot and 100 pounds-mass per cubic foot.

A method for operating a gas turbine engine used in an aircraft, the method comprising providing a fuel flow rate to generate an engine power ($P_{engine}$) associated with a cruise condition for the aircraft, a fuel of the gas turbine engine characterized by a first specific heat capacity ($c_{p\_fuel}$) and a net heat of combustion ($NHC_{fuel}$), and using a pump to circulate a working fluid through a thermal transport bus to heat the fuel in the gas turbine engine, the pump having a pump power ($P_{pump}$) based on the fuel flow rate for the cruise condition, the working fluid characterized by a second specific heat capacity ($c_{p\_pump}$) and a first density ($\rho_{pump}$), wherein $$POW = \frac{P_{pump}}{\left(\frac{c_{p\_pump}}{c_{p\_water}}\right)\left(\frac{\rho_{water}}{\rho_{pump}}\right)^2}, FFR = \left(\frac{P_{engine}}{NHC_{fuel}}\right)\left(\frac{c_{p\_fuel}}{c_{p\_pump}}\right),$$

$0.008 \leq POW/FFR^{5/3} \leq 12$, FFR is between 0.05 pounds-mass per second and 16 pounds-mass per second, and $\rho_{water}$ and $c_{p\_water}$ are the density and specific heat capacity of water, respectively.

The method of any preceding clause, wherein the operating of the pump includes rotating a rotor having a rotor diameter ($D_{rotor}$), and wherein $$ERD = D_{rotor}\left(\frac{c_{p\_pump}}{c_{p\_water}}\right)^{0.25},$$

and $0.4 \leq ERD/FFR^{0.1} \leq 3.0$.

A thermal management system comprising a pump configured to operate at a pump power ($P_{pump}$) to pressurize a working fluid in the thermal management system, the pump including a rotor defining a rotor diameter ($D_{rotor}$), the working fluid characterized by a first specific heat capacity ($c_{p\_pump}$) and a first density ($\rho_{pump}$), a thermal transport bus coupled to the pump and a heat exchanger, the heat exchanger configured to transfer heat to a fuel during operation of a gas turbine engine, the gas turbine engine configured to burn the fuel at a fuel flow rate to generate an engine power ($P_{engine}$) at cruise conditions, the fuel characterized by a third specific heat capacity ($c_{p\_fuel}$) and a net heat of combustion ($NHC_{fuel}$), and wherein $$POW = \frac{P_{pump}}{\left(\frac{c_{p\_pump}}{c_{p\_water}}\right)\left(\frac{\rho_{water}}{\rho_{pump}}\right)^2},$$

$$FFR = \left(\frac{P_{engine}}{NHC_{fuel}}\right)\left(\frac{c_{p\_fuel}}{c_{p\_pump}}\right), ERD = D_{rotor}\left(\frac{c_{p\_pump}}{c_{p\_water}}\right)^{0.25},$$

$0.008 \leq POW/FFR^{5/3} \leq 12$, $0.4 \leq ERD/FFR^{0.1} \leq 3.0$, and FFR is between 0.05 pounds-mass per second and 16 pounds-mass per second, and $\rho_{water}$ and $c_{p\_water}$ are the density and specific heat capacity of water, respectively.

The thermal management system of any preceding clause, wherein FFR is between 0.05 pounds-mass per second and 3.5 pounds-mass per second.

The thermal management system of any preceding clause, wherein FFR is between 0.25 pounds-mass per second and 15 pounds-mass per second.

The thermal management system of any preceding clause, wherein FFR is between 0.05 pounds-mass per second and 3.5 pounds-mass per second.

The thermal management system of any preceding clause, wherein FFR is between 3.5 pounds-mass per second and 16 pounds-mass per second.

The thermal management system of any preceding clause, wherein $P_{engine}$ is between 1.0e6 foot-pounds-force per second and 1.0e8 foot-pounds-force per second.

The thermal management system of any preceding clause, wherein $P_{pump}$ is between 0.0020 horsepower and 1200 horsepower.

The thermal management system of any preceding clause, wherein the pump is a single-stage radial compressor.

The thermal management system of any preceding clause, wherein the pump is a multistage radial compressor.

The thermal management system of any preceding clause, wherein the pump is a single-stage axial compressor.

The thermal management system of any preceding clause, wherein the pump is a multistage axial compressor.

The thermal management system of any preceding clause, wherein the pump is a rotary screw compressor.

The thermal management system of any preceding clause, wherein the rotor diameter ($D_{rotor}$) is between 0.3 inches and 4.4 inches.

The thermal management system of any preceding clause, wherein the net heat of combustion (NHC$_{fuel}$) is between 1.0e6 foot-pounds-force per pound-mass and 1.0e8 foot-pounds-force per pound-mass, and wherein the first specific heat capacity (c$_{p\_fuel}$) is between 100 foot-pounds-force per pound-mass times degree Rankine and 5000 foot-pounds-force per pound-mass times degree Rankine.

The thermal management system of any preceding clause, wherein the fuel is a hydrocarbon fuel.

The thermal management system of any preceding clause, wherein the fuel is hydrogen fuel.

The thermal management system of any preceding clause, wherein the second specific heat capacity (c$_{p\_pump}$) is between 100 foot-pounds-force per pound-mass times degree Rankine and 5000 foot-pounds-force per pound-mass times degree Rankine, and wherein the first density ($\rho_{pump}$) is between 0.1 pounds-mass per cubic foot and 100 pounds-mass per cubic foot.

The thermal management system of any preceding clause, wherein the working fluid is supercritical carbon dioxide.

The thermal management system of any preceding clause, wherein the working fluid is liquid helium.

A system comprising a gas turbine engine configured to burn fuel at a fuel flow rate to generate an engine power (P$_{engine}$), the fuel characterized by a first specific heat capacity (c$_{p\_fuel}$) and a net heat of combustion (NHC$_{fuel}$), a thermal management system including a thermal transport bus configured to transfer heat from a working fluid to the fuel, the working fluid characterized by a second specific heat capacity (c$_{p\_pump}$) and a first density ($\rho_{pump}$), the thermal transport bus including a pump defining a rotor diameter (D$_{rotor}$), and wherein $$ERD = D_{rotor}\left(\frac{c_{p\_pump}}{c_{p\_water}}\right)^{0.25}, FFR = \left(\frac{P_{engine}}{NHC_{fuel}}\right)\left(\frac{c_{p\_fuel}}{c_{p\_pump}}\right),$$

0.4≤ERD/FFR$^{0.1}$≤3.0, FFR is between 0.05 pounds-mass per second and 16 pounds-mass per second, and $\rho_{water}$ and c$_{p\_water}$ are the density and specific heat capacity of water, respectively.

The system of any preceding clause, wherein the pump operates at a pump power (P$_{pump}$), and wherein $$POW = \frac{P_{pump}}{\left(\frac{c_{p\_pump}}{c_{p\_water}}\right)\left(\frac{\rho_{water}}{\rho_{pump}}\right)^2},$$

0.008≤POW/FFR$^{5/3}$≤12, FFR is between 0.05 pounds-mass per second and 16 pounds-mass per second, and $\rho_{water}$ and c$_{p\_water}$ is the density and specific heat capacity of water, respectively.

The system of any preceding clause, wherein FFR is between 0.05 pounds-mass per second and 3.5 pounds-mass per second.

The system of any preceding clause, wherein FFR is between 3.5 pounds-mass per second and 16 pounds-mass per second.

The system of any preceding clause, wherein the pump power (P$_{pump}$) is between 0.0020 horsepower and 1200 horsepower.

The system of any preceding clause, wherein the rotor diameter (D$_{rotor}$) is between 0.3 inches and 4.4 inches.

The system of any preceding clause, wherein FFR is between 0.25 pounds-mass per second and 15 pounds-mass per second.

The system of any preceding clause, wherein FFR is between 0.05 pounds-mass per second and 3.5 pounds-mass per second.

The system of any preceding clause, wherein FFR is between 3.5 pounds-mass per second and 16 pounds-mass per second.

The system of any preceding clause, wherein the pump is a single-stage radial compressor.

The system of any preceding clause, wherein the pump is a multistage radial compressor.

The system of any preceding clause, wherein the pump is a single-stage axial compressor.

The system of any preceding clause, wherein the pump is a multistage axial compressor.

The system of any preceding clause, wherein the pump is a rotary screw compressor.

The system of any preceding clause, wherein the power (P$_{engine}$) is between 1.0e6 foot-pounds-force per second and 1.0e8 foot-pounds-force per second.

The system of any preceding clause, wherein the net heat of combustion (NHC$_{fuel}$) is between 1.0e6 foot-pounds-force per pound-mass and 1.0e8 foot-pounds-force per pound-mass, and wherein the first specific heat capacity (c$_{p\_fuel}$) is between 100 foot-pounds-force per pound-mass times degree Rankine and 5000 foot-pounds-force per pound-mass times degree Rankine.

The system of any preceding clause, wherein the fuel is a hydrocarbon fuel.

The system of any preceding clause, wherein the fuel is hydrogen fuel.

The system of any preceding clause, wherein the second specific heat capacity (c$_{p\_pump}$) is between 100 foot-pounds-force per pound-mass times degree Rankine and 5000 foot-pounds-force per pound-mass times degree Rankine, and wherein the first density ($\rho_{pump}$) is between 0.1 pounds-mass per cubic foot and 100 pounds-mass per cubic foot.

The system of any preceding clause, wherein the working fluid is supercritical carbon dioxide.

The system of any preceding clause, wherein the working fluid is liquid helium.

The following claims are hereby incorporated into this Detailed Description by this reference, with each claim standing on its own as a separate embodiment of the present disclosure.

What is claimed is:

1. An aircraft comprising:
   a gas turbine engine configured to burn fuel at a fuel flow rate to generate an engine power (P$_{engine}$), the fuel characterized by a first specific heat capacity (c$_{p\_fuel}$) and a net heat of combustion (NHC$_{fuel}$); and
   a thermal management system including a thermal transport bus configured to transfer heat from a working fluid to the fuel, the working fluid characterized by a second specific heat capacity (c$_{p\_pump}$) and a first density ($\rho_{pump}$), the thermal transport bus including a pump configured to generate a pump power (P$_{pump}$) to pressurize the working fluid in the thermal transport bus, and wherein $$POW = \frac{P_{pump}}{\left(\frac{c_{p\_pump}}{c_{p\_water}}\right)\left(\frac{\rho_{water}}{\rho_{pump}}\right)^2}, FFR = \left(\frac{P_{engine}}{NHC_{fuel}}\right)\left(\frac{c_{p\_fuel}}{c_{p\_pump}}\right),$$

$0.008 \leq POW/FFR^{5/3} \leq 12$, FFR is between 0.05 pounds-mass per second and 16 pounds-mass per second, and $\rho_{water}$ and $c_{p\_water}$ are the density and specific heat capacity of water, respectively.

2. The aircraft of claim 1, wherein the pump includes a rotor having a rotor diameter ($D_{rotor}$), and wherein $$ERD = D_{rotor}\left(\frac{c_{p\_pump}}{c_{p\_water}}\right)^{0.25},$$

and $0.4 \leq ERD/FFR^{0.1} \leq 3.0$.

3. The aircraft of claim 2, wherein the rotor diameter ($D_{rotor}$) is between 0.3 inches and 4.4 inches.

4. The aircraft of claim 1, wherein FFR is between 0.05 pounds-mass per second and 3.5 pounds-mass per second.

5. The aircraft of claim 1, wherein FFR is between 3.5 pounds-mass per second and 16 pounds-mass per second.

6. The aircraft of claim 1, wherein the pump is a single-stage radial compressor.

7. The aircraft of claim 1, wherein the pump is a multi-stage radial compressor.

8. The aircraft of claim 1, wherein the net heat of combustion ($NHC_{fuel}$) is between 1.0e6 foot-pounds-force per pound-mass and 1.0e8 foot-pounds-force per pound-mass, and wherein the first specific heat capacity ($c_{p\_fuel}$) is between 100 foot-pounds-force per pound-mass times degree Rankine and 5000 foot-pounds-force per pound-mass times degree Rankine.

9. The aircraft of claim 1, wherein the fuel is a hydrocarbon fuel.

10. The aircraft of claim 1, wherein the fuel is hydrogen fuel.

11. The aircraft of claim 1, wherein the second specific heat capacity ($c_{p\_pump}$) is between 100 foot-pounds-force per pound-mass times degree Rankine and 5000 foot-pounds-force per pound-mass times degree Rankine, and wherein the first density ($\rho_{pump}$) is between 0.1 pounds-mass per cubic foot and 100 pounds-mass per cubic foot.

12. The aircraft of claim 1, wherein the working fluid is supercritical carbon dioxide.

13. The aircraft of claim 1, wherein the working fluid is liquid helium.

14. A gas turbine engine comprising:
   a combustion section to burn fuel at a fuel flow rate to operate at an engine power ($P_{engine}$), the fuel characterized by a first specific heat capacity ($c_{p\_fuel}$) and a net heat of combustion ($NHC_{fuel}$); and
   a thermal transport bus pump to operate at a pump power ($P_{pump}$) based on the fuel flow rate to pump a working fluid through a thermal transport bus to heat the fuel in the gas turbine engine prior to combustion, the working fluid characterized by a second specific heat capacity ($c_{p\_pump}$) and a first density ($\rho_{pump}$), wherein $$POW = \frac{P_{pump}}{\left(\frac{c_{p\_pump}}{c_{p\_water}}\right)\left(\frac{\rho_{water}}{\rho_{pump}}\right)^2}, FFR = \left(\frac{P_{engine}}{NHC_{fuel}}\right)\left(\frac{c_{p\_fuel}}{c_{p\_pump}}\right),$$

$0.008 \leq POW/FFR^{5/3} \leq 12$, FFR is between 0.05 pounds-mass per second and 16 pounds-mass per second, and $\rho_{water}$ and $c_{p\_water}$ are the density and specific heat capacity of water, respectively.

15. The gas turbine engine of claim 14, wherein the thermal transport bus pump includes a rotor having a rotor diameter ($D_{rotor}$), and wherein $$ERD = D_{rotor}\left(\frac{c_{p\_pump}}{c_{p\_water}}\right)^{0.25},$$

and $0.4 \leq ERD/FFR^{0.1} \leq 3.0$.

16. The gas turbine engine of claim 14, wherein FFR is between 0.05 pounds-mass per second and 3.5 pounds-mass per second.

17. The gas turbine engine of claim 14, wherein FFR is between 3.5 pounds-mass per second and 16 pounds-mass per second.

18. The gas turbine engine of claim 14, wherein the net heat of combustion ($NHC_{fuel}$) is between 1.0e6 foot-pounds-force per pound-mass and 1.0e8 foot-pounds-force per pound-mass, and wherein the first specific heat capacity ($c_{p\_fuel}$) is between 100 foot-pounds-force per pound-mass times degree Rankine and 5000 foot-pounds-force per pound-mass times degree Rankine.

19. The gas turbine engine of claim 14, wherein the second specific heat capacity ($c_{p\_pump}$) is between 100 foot-pounds-force per pound-mass times degree Rankine and 5000 foot-pounds-force per pound-mass times degree Rankine, and wherein the first density ($\rho_{pump}$) is between 0.1 pounds-mass per cubic foot and 100 pounds-mass per cubic foot.

20. A method for operating a gas turbine engine used in an aircraft, the method comprising:
   providing a fuel flow rate to generate an engine power ($P_{engine}$) associated with a cruise condition for the aircraft, a fuel of the gas turbine engine characterized by a first specific heat capacity ($c_{p\_fuel}$) and a net heat of combustion ($NHC_{fuel}$); and
   using a pump to circulate a working fluid through a thermal transport bus to heat the fuel in the gas turbine engine, the pump having a pump power ($P_{pump}$) based on the fuel flow rate for the cruise condition, the working fluid characterized by a second specific heat capacity ($c_{p\_pump}$) and a first density ($\rho_{pump}$), wherein $$POW = \frac{P_{pump}}{\left(\frac{c_{p\_pump}}{c_{p\_water}}\right)\left(\frac{\rho_{water}}{\rho_{pump}}\right)^2}, FFR = \left(\frac{P_{engine}}{NHC_{fuel}}\right)\left(\frac{c_{p\_fuel}}{c_{p\_pump}}\right),$$

$0.008 \leq POW/FFR^{5/3} \leq 12$, FFR is between 0.05 pounds-mass per second and 16 pounds-mass per second, and $\rho_{water}$ and $c_{p\_water}$ are the density and specific heat capacity of water, respectively.

21. The method of claim 20, wherein the operating of the pump includes rotating a rotor having a rotor diameter ($D_{rotor}$), and wherein $$ERD = D_{rotor}\left(\frac{c_{p\_pump}}{c_{p\_water}}\right)^{0.25},$$

and $0.4 \leq ERD/FFR^{0.1} \leq 3.0$.

* * * * *